United States Patent [19]
Kanayama

[11] Patent Number: 6,134,486
[45] Date of Patent: Oct. 17, 2000

[54] ROBOT AND METHOD OF CONTROL FOR AN AUTONOMOUS VEHICLE TO TRACK A PATH CONSISTING OF DIRECTED STRAIGHT LINES AND CIRCLES WITH POSITIONAL FEEDBACK AND CONTINUOUS CURVATURE

[75] Inventor: Yutaka John Kanayama, Salinas, Calif.

[73] Assignee: The United States of America as represented by the Secretary of the Navy, Washington, D.C.

[21] Appl. No.: 09/071,451

[22] Filed: Apr. 20, 1998

[51] Int. Cl.[7] ............................. G06F 9/00; G06F 165/00
[52] U.S. Cl. ................................................. 701/23; 701/25
[58] Field of Search .................................. 701/23, 25, 26, 701/217, 300, 301; 901/1; 318/587

[56] References Cited

U.S. PATENT DOCUMENTS

| | | | |
|---|---|---|---|
| 4,816,998 | 3/1989 | Ahlbom | 701/23 |
| 5,109,340 | 4/1992 | Kanayama | 701/25 |
| 5,233,526 | 8/1993 | Detriche et al. | 701/26 |
| 5,390,125 | 2/1995 | Sennott et al. | 364/449 |
| 5,657,226 | 8/1997 | Shin et al. | 701/23 |
| 5,680,306 | 10/1997 | Shin et al. | 364/424.02 |
| 5,739,657 | 4/1998 | Takayama et al. | 318/587 |

OTHER PUBLICATIONS

Y.J. Kanayama, F. Fahroo, "A New Line Tracking Method for Non Holonomic Vehicles," Proceedings of the 1997 IEEE International Conference on Robotics and Automation, Alguquerque, New Mexico, Apr. 1997.

Y. J. Kanayama, F. Fahroo, "A Circle Tracking Method for NonHolonomic Vehicles," Proceedings of 5th Symposium on Robot Control, SYROCO '97, in Nantes, France, Sep. 3–5, 1997.

Wada et.; Omnidirectional Holonomic Mobile Robot Using Nonholonomic Wheels; IEEE– Intelligent Robots and Systems 95; Aug. 1995; vol. 3, pp. 446–453.

Simeon et al.; Computing Good Holonomic Collision–Free Paths to Steer Nonholonomic Mobile Robots; IEEE– Intelligent Robots and Systems 1997; Sep. 1997; vol. 2, pp. 1004–1010.

Tayebi et al.; Path Following Control Law for an Industrial Mobile Robot; IEEE– Control Applications 1996; Sep. 1996; pp. 70–707.

Zulli et al.; Motion Planning and Control for Non–Holonomic Mobile Robots; IEEE– Intelligent Control 1995; Aug. 1995; pp. 551–557.

Bicchi et al.; Planning Shorteset Bounded–Curvature Paths for a Class of Nonholonomic Vehicles among Obstacles; IEEE– Robotics and Automation 1995; May 1995; vol. 2, pp. 1349–1354.

*Primary Examiner*—Michael J. Zanelli
*Attorney, Agent, or Firm*—Donald E. Lincoln

[57] ABSTRACT

A vehicle control system having a computer control system, wherein the computer control system comprises a Vehicle-Independent Subsystem and a Vehicle-Dependent Subsystem, and wherein the Vehicle-Independent Subsystem inputs vehicle incremental movement distance and vehicle incremental heading-orientation change from the Vehicle-Dependent Subsystem and outputs commanded path curvature and commanded speed to the Vehicle-Dependent Subsystem, and wherein the Vehicle-Dependent Subsystem inputs the commanded path curvature and commanded speed from the Vehicle-Independent Subsystem, and outputs the incremental vehicle movement distance and vehicle heading-orientation change to the Vehicle-Independent Subsystem, wherein the computer control system has the capability of controlling the execution steps at a constant sampling time interval so that the vehicle system can track a path consisting of lines and/or circular arcs with positional feedback and continuous curvature.

7 Claims, 21 Drawing Sheets

ROBOT AND METHOD OF CONTROL FOR AN AUTONOMOUS VEHICLE TO TRACK A PATH CONSISTING OF DIRECTED STRAIGHT LINES AND CIRCLES WITH POSITIONAL FEEDBACK AND CONTINUOUS CURVATURE

BACKGROUND OF THE INVENTION

1. Field of the Invention

This invention pertains to an unmanned nonholonomic wheeled robot vehicle that automatically drives on a flat or moderately tilted ground. More specifically, this invention claims a method of how to control unmanned vehicles smoothly when given a geometrical path specification, which is a sequence of directed straight lines and circles described in the global coordinate system.

2. Description of the Related Art

Unmanned robot vehicles have been used for the automatic material transfer and/or handling purposes in factories, in hospitals, and in clean rooms for semiconductor manufacturing. In order to navigate the unmanned vehicles, the most widely used method is to attach inductive wires or optical reflexive tapes on the floor to tell the vehicle whether it is on track.

However, these conventional methods entails three barriers that limit more extensive applications of unmanned vehicles: The inductive wires and optical tapes are subject to wear because vehicles and people could step on them; Modifying and creating their path patterns is time consuming and expensive; In environments such as in semiconductor factories, even the use of wires and tapes should be avoided, because they are potential source of dusts.

The theoretical aspect of path-tracking for nonholonomic wheeled mobile robots by feedback controllers has been studied from various points of view. Motion planning/control problems for autonomous vehicles is one of the most difficult problems in robotics, because these motions are under nonholonomic constraints and the equations are not integrable. See Goldsteing, H., *Classical Mechanics*, Second Edition, Addison-Wesley, pp. 11–16, 1980 and Laumond, J. P., "Feasible Trajectories for Mobil Robots with Kinematic and Environment Constraints," in *Intelligent Autonomous Systems*, (O. L. Hertzberger and F. C. A. Groen, eds), pp. 346–354, 1987. The "configuration tracking" problem, when posed as stabilizing a nonholonomic vehicle to a given final configuration is known to have no smooth-state feedback solution, as described in Brockett, R. W., "Asymptotic Stability and Feedback Stabilization," in *Progress in Math.*, vol. 27, Birkhauser, pp. 181–208, 1983. To overcome this difficulty, Samson and Pomet proposed a smooth time varying feedback control law for stabilizing a robot, or even a chained system of wheeled robots to a given final configuration. See: Samson, C. "Velocity and Torque Feedback Control of a Nonholonomic Cart," in *Advanced Robot Control, Lecture Notes in Control and Information Sciences*, No. 162, pp. 125–151, 1991, Samson, C., "Time-varying Feedback Stabilization of Car-like Wheeled Mobil Robots," *International Journal of Robotics Research*, vol. 12, No. 1, pp. 55–64, 1995, and Pomet, J. B., "Explicit Design of Time Varying Stabilizing Feedback Laws for a Class of Controllable Systems without Drift," *System and Control Letters*, vol. 18, pp. 139–145, 1992. Others such as Canudas and Sørdalen have proposed piecewise smooth feedback laws for exponentially stabilizing a mobile robot. See: Canudas de Witt, C. and Sørdalen, O. J., "Exponential Stabilization of Mobil Robots with Nonholonomic Constraints," *IEEE Transaction on Automatic Control*, Vol 37, pp. 1791–1797, 1992. For the specific problem of tracking a simple path such as a straight-line or a circle, DeSantis has developed a control rule based on the geometric path tracking principle for a tractor-trailer-like robots to track a straight line or a circular arc. See: DeSantis, R. M., "Path-tracking for a Trailer-like Robot," *International Journal of Robotics Research*, Vol. 13, No. 6, pp. 533–543, 1994. Murray and Sastry use sinusoidal input to solve a similar nonholonomic motion planning problem. See Murray, R. M., and Sastry, S. S., "Steering Nonholonomic Control Systems Using Sinusoids," in *Nonholonomic Planning*, Li and Canny eds., Kluwer Academic Publishers, pp. 23–51. 1993.

The research article, "A Stable Tracking Control Method for an Autonomous Mobile Robot," by Kanayama, et al., in Proc. IEEE International Conference on Robotics and Automation in Cincinnati, Ohio, pp. 384–389, May 1990, by this inventor is the closest prior technology to solve the path tracking problem for autonomous vehicles. Given a moving reference target, this method computes a pair $(\upsilon, \Omega)$ of the goal linear velocity $\upsilon$ and the goal rotational velocity $\Omega$ knowing the vehicle's own current state. A reference state is $(p_r, \theta_r, \upsilon_r, \Omega_r)$ that the vehicle should follow, where $p_r$ is the reference point, $\theta_r$ the reference orientation, $\upsilon_r$ the reference linear speed, and $\Omega_r$ the reference rotational speed. Since the curvature $\kappa$ is equal to $\Omega/\upsilon$, this method can be said to be evaluating the target speed and curvature among other control variables. This method has the following shortcomings as a solution to the aforementioned problem:

(1) This method is proven effective in tracking straight lines only. The fact that this method is optimal for tracking circles or a more complex path cannot be proved.

(2) The vehicle guidance method of using the moving reference state imposes an unnecessary constraint on its movement in the heading.

(3) This method is computing curvature $\kappa$ itself instead of its derivative $$\left(\frac{d\kappa}{ds}\right).$$

Therefore, if there is a discontinuous change in the reference state, its curvature may have a discontinuity which may give a shock to the vehicle or may cause slippage in its motion.

While the above theoretical approaches are mathematically elegant and general enough to be applied to a variety of situations, these procedures have not yielded the simplest and most efficient feedback controllers for the specific problem of "line/circle tracking". The aforementioned tracking-control method is not satisfactory to this motion control problem either. To solve this shortcoming this invention addresses another solution to how to control a nonholonomic vehicle to track a path consisting of directed straight lines and directed circular arcs. This invention discloses a new solution using the "steering function" and a "neutral switching principle", which are simple and appropriate for real-time applications. Since this invention realizes continuous curvature motion, slippage of wheels on the ground can be minimized.

OBJECTIVES OF THE INVENTION

It is an objective of this invention to provide a path specification method to the vehicle control computer, so that the implementation of optical tapes or inductive wires on the floor can be eliminated. Specifically a path is a sequence of segments, where a segment is a directed straight line or a directed circle defined in a global coordinate system.

Providing a robust and flexible method to track this path with continuous curvature is another objective of this invention. This tracking algorithm with the steering function is critical in this invention. Especially when the vehicle switches from the present path segment to the next, or when the vehicle is initially not on track, its effectiveness is obvious. In order to specify the extent of smoothness in switching or tracking of segments, this method has a parameter $\sigma$ called smoothness. The vehicle trajectory becomes sharper if a smaller $\sigma$ is used, while the vehicle trajectory becomes smoother if a larger $\sigma$ is used. In order to switch from the present path segment to the next segment, a method called neutral switching is adopted in this invention.

Since paths for the vehicle are described in relation to the global coordinate system, the vehicle must keep track of its position and heading orientation in the global coordinate system; otherwise the vehicle cannot recognize whether it is on the path or not. To give a simple and efficient method for this odometry capability is another purpose of this invention. This odometry and the steering function capabilities are crucial components for the positional feedback operation.

LIST OF ADVANTAGES OF THE INVENTION

The first advantage comes from the fact that this path description method requires only small amount of digital data. A complex path consisting of segments of directed straight lines or circular arcs can be specified by a relatively small amount of digital information, since each segment can be specified by four real numbers, the x and y coordinates, the orientation $\theta$, and the curvature $\kappa$. Therefore, it is not expensive nor time-consuming to create and store a path in the computer system on the vehicle. It is easy to modify a path even in real time to accommodate changes in its environments and/or missions. This path-specification method requires much less information amount and gives much more useful information to the vehicle than the method of describing a path by a dense sets of points.

The second advantage is related to the steering function method. This method allows the vehicle to perform continuous-curvature motion to make an exponential convergence with a critical-damping condition. This property is important for vehicle control, since a continuous-curvature motion without oscillation is essential for vehicle motion stability.

The third advantage is in the simplicity of the steering function. In this function, we only need to compute the vehicle path curvature, the vehicle heading orientation, and the positional difference between the vehicle position and the current path segment. Thus, its computation takes only a few milliseconds using a modern microprocessor to complete a short sampling time.

The fourth advantage is that the steering function has one parameter (positive constant) of smoothness $\sigma$ so that its path smoothness can be easily and precisely specified or modified. A larger $\sigma$ makes the vehicle's path smoother, and a smaller $\sigma$ makes the vehicle's path sharper. The smoothness can even be dynamically modified in real time depending of its environment and mission.

The fifth advantage is that the problem of finding the best point to leave the present tracking segment to the next tracking segment is easily and robustly computed by the neutral switching principle. By this method, not only the path curvature, but its derivative becomes continuous. Switching this point makes the transition curve the most symmetric.

The sixth advantage is that the path can be described in a computer program with the help of a vehicle motion control language system. Each path segment is described by a command, and hence, a path can be described by a sequence of commands. Thus, it is straightforward for a computer program to control the vehicle to track a complex path by issuing those segment-specifying commands in real time.

The seventh advantage is the clear separation of the vehicle into the Vehicle-Independent Subsystem and the Vehicle-Dependent Subsystem in this motion-control architecture and software. This feature makes individual embodiments simpler and more robust, because the bigger Vehicle-Independent Subsystem is the same for all embodiments.

Figure 1:
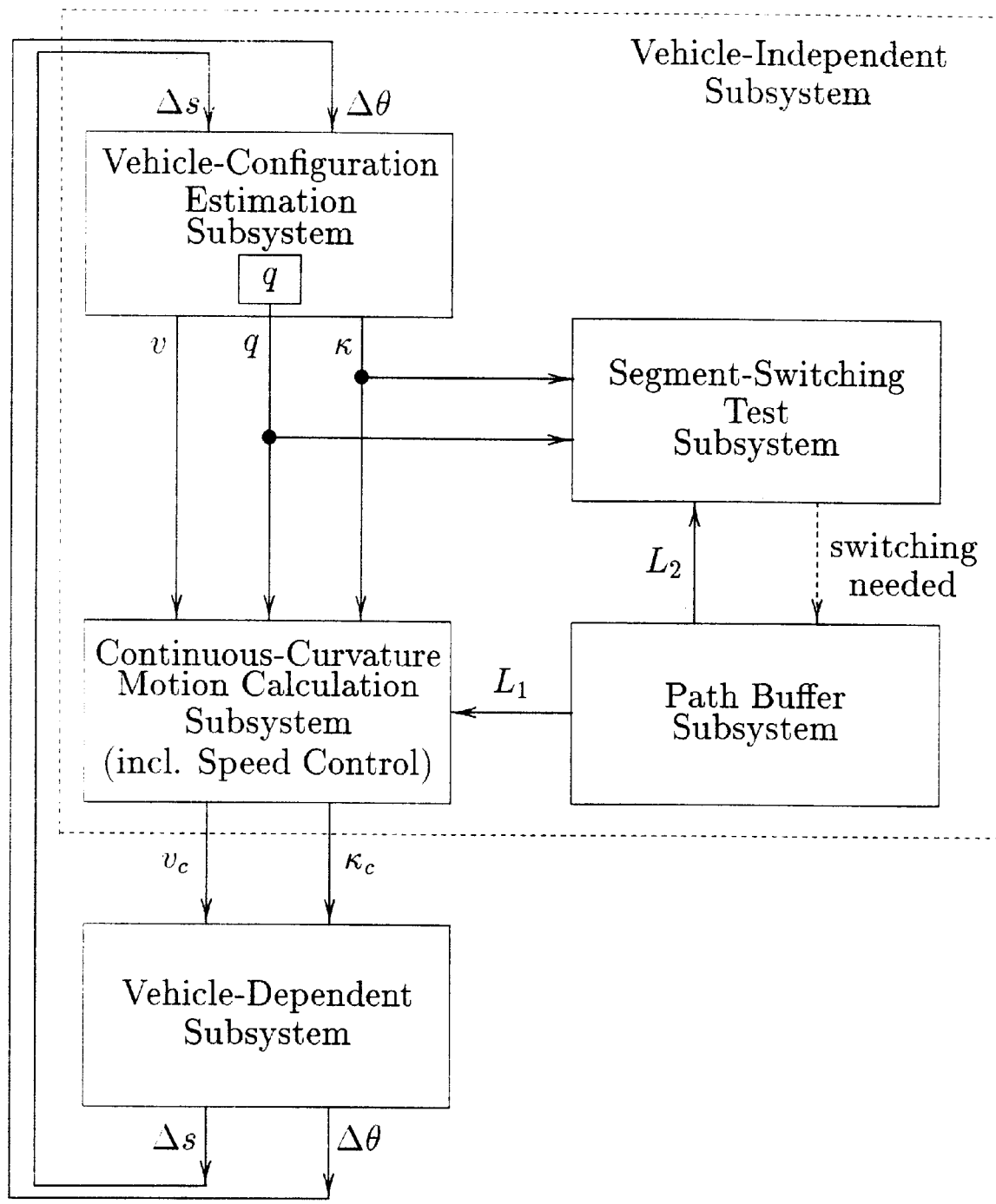
FIG. 1 depicts the system architecture of an example of embodiment of this invention in a functional-subsystem level. The whole system is divided into the Vehicle-Independent and Vehicle-Dependent Subsystems. The interface signals between the subsystems are only four: $\Delta s$, $\Delta \theta$, $v_c$, and $\kappa_c$. The Vehicle-Independent Subsystem is further subdivided into four Subsystems in this specific embodiment.

| GLOSSARY | |
|---|---|
| $p = (x, y)$ | Vehicle position |
| $\theta$ | Vehicle heading orientation |
| $q = (p, \theta)$ | Vehicle transformation |
| $\kappa$ | Vehicle present trajectory curvature |
| $(q, \kappa)$ | Vehicle configuration |
| $K_d$ | Commanded curvature |
| $L_1$ | Present path segment |
| $L_2$ | Next path segment |
| $\Delta t$ | Sampling time interval |
| $\Delta s$ | Incremental moving distance |
| $\Delta \theta$ | Incremental heading-orientation change |
| $\Delta q = (\Delta x, \Delta y, \Delta \theta)$ | Vehicle incremental transformation |
| $\Delta d$ | Signed distance from vehicle to path segment |
| $v$ | Present vehicle speed |
| $v_c$ | Commanded speed |
| $s$ | Trajectory length |
| $p_1, \theta_1, \kappa_1$ | Variables for current path segment |
| $p_o$ | Projection of vehicle position on path segment |
| $J(L)$ | Steering function for path segment L |
| $c_1 = (x_{c1}, y_{c1})$ | Center of circular path segment |
| $r_1$ or $R$ | Radius of circular path segment |
| $k$ | Positive parameter for feedback control |
| $(a, b, c)$ | Feedback gains |
| $v_o$ | Default vehicle speed |
| $m$ | Vehicle mass |
| $f$ | Centrifugal force applied to vehicle |
| $f_{max}$ | The maximum centrifugal force applied to vehicle |
| $v_{max}$ | The maximum vehicle speed due to $f_{max}$ |
| $u$ | Default vehicle acceleration |
| $x_1, x_2, x_3$ | Variables needed for linearization |
| $(p, \theta)$ | Polar coordinate representation for vehicle position |
| $h = kR$ | Parameter for linearization in the circle-tracking case |
| $w$ | A one-half of tread in differential-drive vehicle |
| $\Delta d_L$ | Incremental motion at left wheel |
| $\Delta d_R$ | Incremental motion at right wheel |
| $\Delta_{NL}$ | Incremental motion for left encoder |
| $\Delta_{NR}$ | Incremental motion of right encoder |
| $N$ | Total number of pulse counts for one complete turn of motor |
| $G$ | Gear ratio |
| $d$ | Wheel diameter |
| segment | a directed straight line or a directed circular arc |
| path | Sequence of segments to be tracked by vehicle |
| trajectory | Vehicle's locus as a result of its motion |

DESCRIPTION OF THE PREFERRED EMBODIMENT

An embodiment of this invention consists of two subsystems: Vehicle-Independent Subsystem and Vehicle-Dependent Subsystem [FIG. 1]. This clear separation of the Vehicle-Independent and Vehicle-Dependent Subsystems is one of the advantages of this invention. This control architecture makes embodiments of this method easy and economical, since the Vehicle-Independent Subsystem stays the same for all individual vehicle implementations. The Vehicle-Independent Subsystem is common to the embodiment for any vehicle architecture and is further divided into four subsystems: (i) Vehicle-Configuration Estimation Subsystem, (ii) Path Buffer Subsystem, (iii) Continuous- Curvature Motion Calculation Subsystem, and (iv) Segment Switching Test Subsystem. For the Vehicle-Dependent Subsystem five typical distinct embodiments, for the differential-drive, bicycle, tricycle, car-like wheel architectures, and a simulator, are described. Obviously many modifications and variations of the present invention are possible in light of the above teachings. It is, therefore, to be understood that the present invention may be practiced within the scope of the claims other than as specifically described.

[1] Path Buffer Subsystem

A path consists of a sequence of segments, where a segment is either a directed line or a directed circle.

Figure 2:
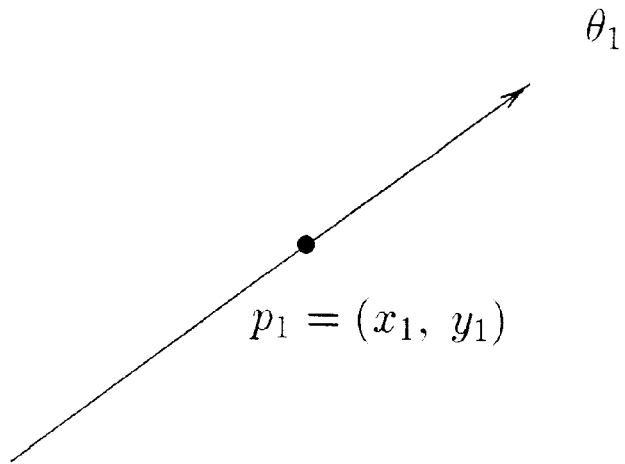
FIG. 2 depicts how a directed line is defined by a point $p_1$ and an orientation $\theta_1$.

A directed line is represented by a point $p_1$ and an orientation $\theta_1$, i.e., it has the same amount of information as a transformation q does. [FIG. 2]

Figure 3:
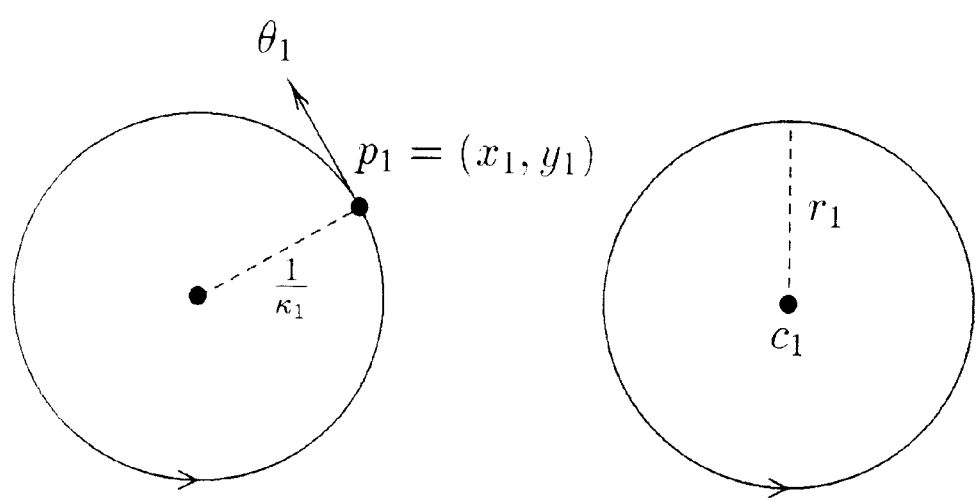
FIG. 3 depicts how a directed circular arc is defined, (i) by a point $p_1$, an orientation $\theta_1$, and a curvature $\kappa_1$, or (ii) by a center point $c_1$ and a radius $r_1$. Specifically in this Figure, both circles are counterclockwise.

A directed circular arc is represented either (i) by a point $p_1$, an orientation $\theta_1$, and a curvature $\kappa_1$, or (ii) by a center point $c_1$ and a radius $r_1$ [FIG. 3]. In the first representation $(p_1, \theta_1, \kappa_1)$, $p_1$ specifies a point on the circular arc and $\theta_1$ the tangential orientation to the arc at $p_1$. The last parameter $\kappa_1$ is the curvature of the circular arc, and hence, its absolute value is equal to $1/r$, where r is its radius. The circular arc is counterclockwise if $\kappa_1>0$, and clockwise if $\kappa_1<0$. In the second representation $(c_1, r_1)$, different from the normal practice, the radius $r_1$ may be positive or negative. The circle specified is counterclockwise if $r_1>0$ and clockwise if $r_1<0$.

Figure 4:
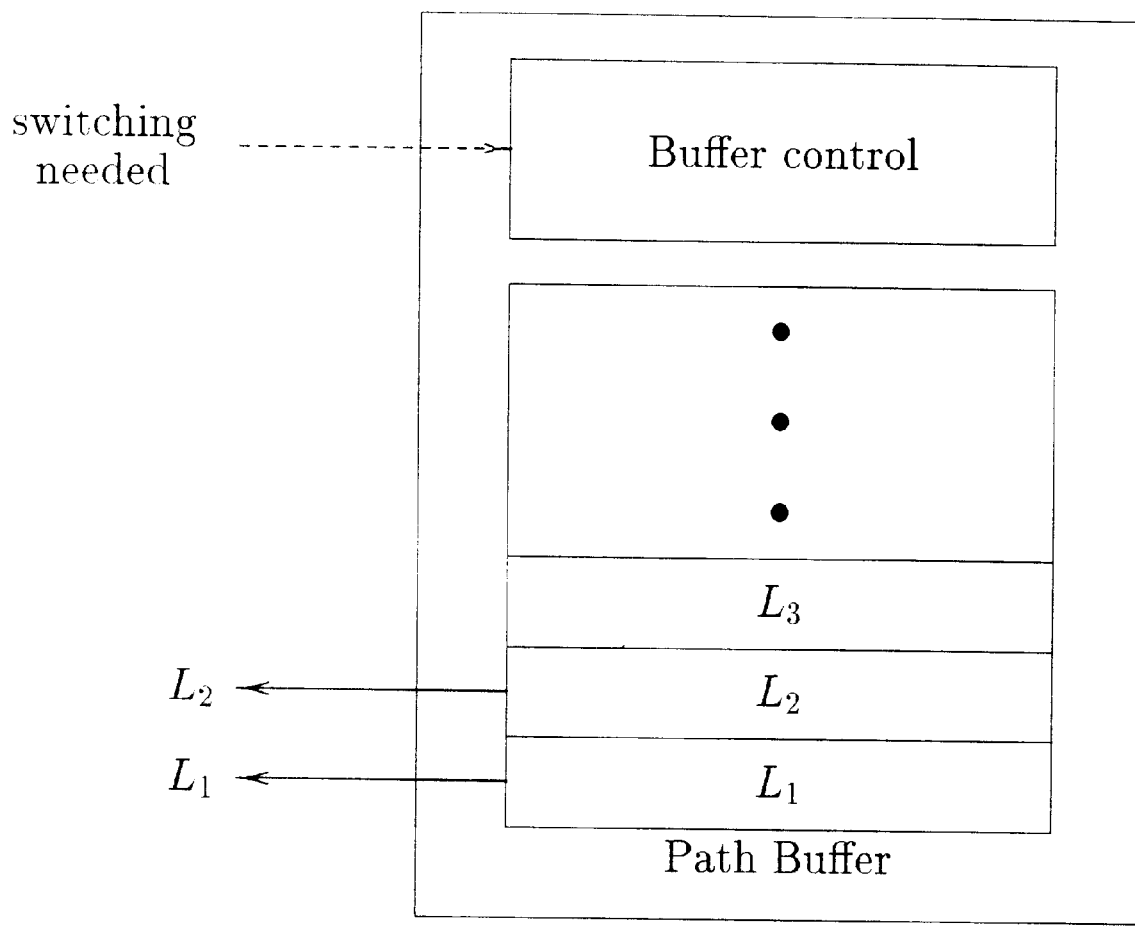
FIG. 4 shows a detailed structure of the Path Buffer Subsystem. The path buffer stores a list ($L_1$, $L_2$, $L_3$ . . . ) of segments, where the first segment $L_1$, and the second segment $L_2$ are read by other subsystems. There is a control mechanism which shifts the contents of the path buffer to discard $L_1$, if the "switching-needed" command arrives.
Figure 5:
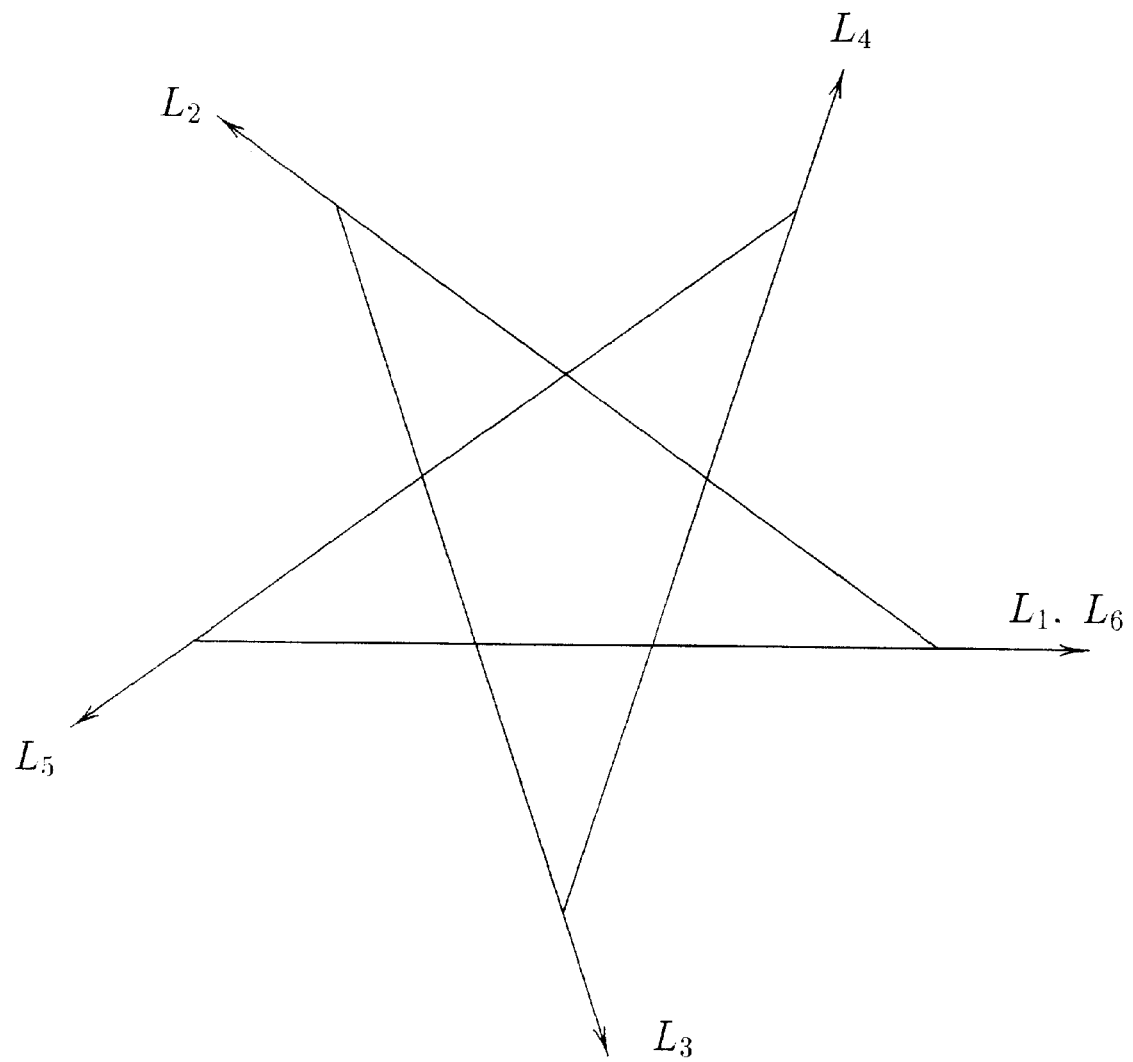
FIG. 5 depicts a sequence ($L_1$, $L_2$, $L_3$, $L_4$, $L_5$, $L_6$) of directed straight lines, where $L_1$ and $L_6$ are the same. The vehicle is supposed to track this path with an appropriate smoothness.
Figure 6:
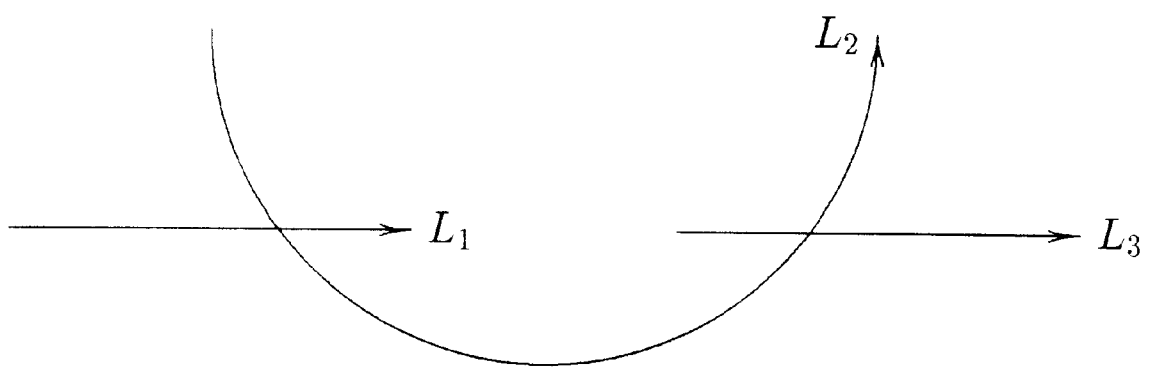
FIG. 6 depicts another sequence ($L_1$, $L_2$, $L_3$), where $L_1$ and $L_3$ are directed straight lines and $L_2$ is a directed circular arc.

The Path Buffer Subsystem consists of a path buffer and its control [FIG. 4]. A path stored in the buffer is a sequence $(L_1, L_2, \ldots, L_n)$, where each $L_i$ is a segment. FIG. 5 and FIG. 6 depict two examples of paths. Given this path information, the vehicle tracks the first segment $L_1$. For that purpose $L_1$ is supplied to the Continuous-Curvature Motion Calculations Subsystem to find the optimal feedback way to navigate the vehicle [FIG. 1]. The Segment-Switching Test Subsystem finds the optimal point to leave $L_1$ and to turn into the next segment $L_2$, if $L_2$ exits. When this Segment-Switching Test Subsystem recognizes that this is the optimal time to switch, it triggers the Path Buffer Subsystem by the "switching needed" command, which in turn discards $L_1$, moves the old $L_2$ into new $L_1$, moves the old $L_3$ into new $L_2$, and so forth [FIG. 4]. The example paths shown in FIG. 5 and FIG. 6 actually navigate the vehicle to make a star motion [FIG. 7] and an obstacle avoidance behavior [FIG. 8] when the steering function and the neutral switching algorithm are correctly applied [See Section 2 and Section 3].

[2] Vehicle-Configuration Estimation Subsystem

The function of this subsystem is to compute the best estimates of the vehicle's present configuration, which is a pair of a transformation q (the position p and heading orientation $\theta$) and a path curvature $\kappa$. This transformation q is always registered and updated in this subsystem to be used for the motion control method [FIG. 1]. The capability of this subsystem sometimes is called odometry on autonomous robot vehicles.

The input set for this capability includes (1) the incremental movement $\Delta s$ of the vehicle reference point and the incremental heading orientation change $\Delta\theta$ during the previous sampling time interval that are sent from the vehicle-dependent subsystem, (2) the previous vehicle transformation $q=(p, \theta)$ registered in this subsystem, and (3) the values of the sampling time interval $\Delta t$ that is a constant.

The output of this subsystem are the updated present transformation q, the present path curvature $\kappa$, and the present vehicle speed $\upsilon$.

A global cartesian coordinate system is defined in the plane where the robot vehicle is operated. The vehicle's positioning is described by its position $p=(x, y)$ and heading orientation $\theta$ in the global coordinate system, where x, y, and $\theta$ are real numbers [FIG. 9]. The orientation $\theta$ is measured counterclockwise from the positive orientation of X-axis. This positioning $$q=(x, y, \theta) \quad (1)$$

is considered as a transformation of the vehicle from the reference transformation of $$q_0=(0, 0, 0) \quad (2)$$

Figure 9:
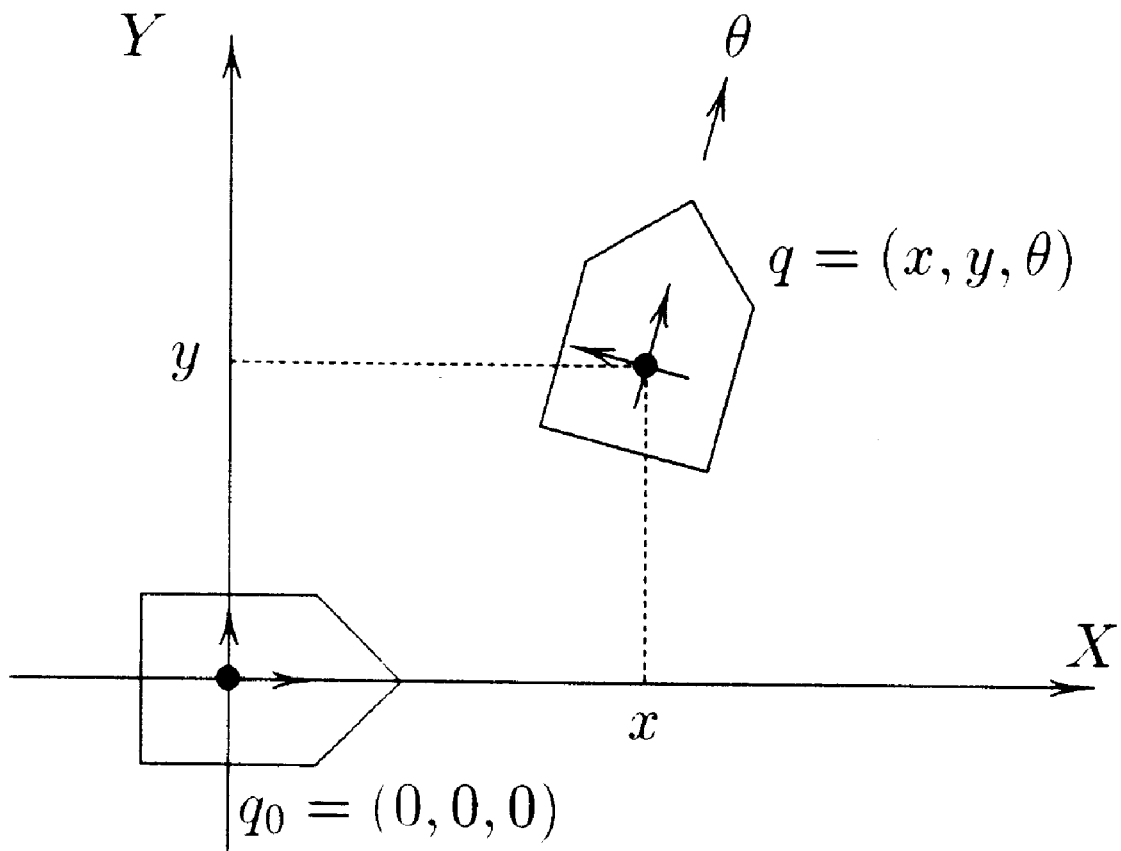
FIG. 9 depicts a vehicle's transformation q=(x, y, $\theta$) and the reference transformation (0, 0, 0).

[FIG. 9]. The transformation q is the composition of a translation $(x, y, 0)$ and a rotation $(0,0,\theta)$.

Figure 10:
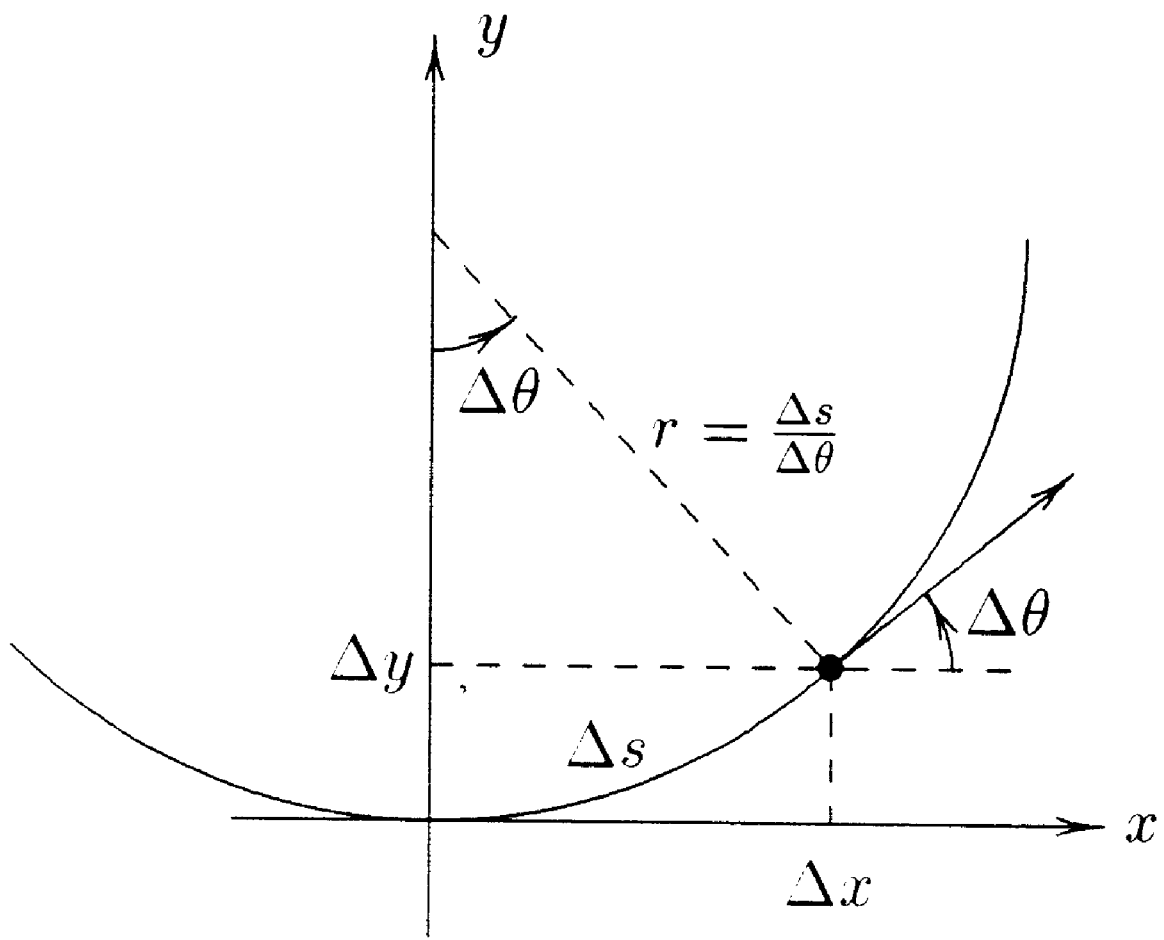
FIG. 10 depicts a circular transformation $\Delta q=(\Delta x, \Delta y, \Delta \theta)$ defined by $\Delta s$ and $\Delta \theta$.

While moving, the vehicle's instantaneous transformations $q=(x, y, \theta)$ must be iteratively estimated along a path at a constant sampling time interval $\Delta t$. The vehicle's traveling distance $\Delta s$ and the heading orientation change $\Delta\theta$ during the sampling interval $\Delta t$ are measured in the Vehicle-Dependent Subsystem. Assuming that the vehicle's short trajectory in this period was a circular arc or a straight line [FIG. 10], the transformation $\Delta q=(\Delta x, \Delta y, \Delta\theta)$, from the previous positioning to the final positioning, is evaluated from $\Delta s$ and $\Delta\theta$ as $$\Delta q = \left(\left(\frac{\sin\Delta\theta}{\Delta\theta}\right)\Delta s, \left(\frac{1-\cos\Delta\theta}{\Delta\theta}\right)\Delta s, \Delta\theta\right) \quad (3)$$

if $\Delta\theta \neq 0$ and $$\Delta q=(\Delta s, 0, 0) \quad (4)$$

if $\Delta\theta=0$.

In an ordinary situation, $\Delta s$ and $\Delta\theta$ are very small, and hence $\Delta q$ is also tiny.

If the vehicle's previous transformation is q and the circular transformation is $\Delta q$, the new vehicle transformation is the composition $q \cdot \Delta q$. This composition $q \cdot \Delta q$ is calculated as $$q \leftarrow q \cdot \Delta q = (x, y, \theta) \cdot (\Delta x, \Delta y, \Delta\theta) = (x + \Delta x \cos\theta - \Delta y \sin\theta, y + \Delta x \sin\theta + \Delta y \cos\theta, \theta + \Delta\theta) \quad (5)$$

See: Kanayama, Y., MacPherson, D. L., and Krahn, G. W., "Two Dimensional Transformations and Its Application to Vehicle Motion Control and Analysis," 1993 Proceedings of International Conference on Robotics and Automation, in Atlanta, Ga., May 2–7, pp. 13–18, 1993. By repeating this updating of vehicle transformations q, the vehicle knows the best estimate of its positioning all the time. This function is called odometry. This odometry, or positional feedback, capacity is essential for the task of tracking a path described by the global coordinate system.

The present vehicle path curvature $\kappa$ is calculated by $$\kappa = \frac{\Delta\theta}{\Delta s}. \quad (6)$$

The present vehicle speed $\upsilon$ is calculated by $$v = \frac{\Delta s}{\Delta t}. \quad (7)$$

These outputs, q, κ, and υ are sent to the Continuous-Curvature Motion Calculation Subsystem and the Segment-Switching Test Subsystem as shown in FIG. 1.

[3] Continuous-Curvature Motion Calculation Subsystem

A nonholonomic vehicle cannot make a trajectory that has curvature discontinuity. See Kanayama, Y., "Two Dimensional Wheeled Vehicle Kinematics," Proceedings of International Conference on Robotics and Automation, in San Diego, Calif., May 8–13, pp. 3079–3084, 1994. This invention, thus, proposes a method to compute the derivative dκ/ds of curvature, so that the curvature itself is continuous as long as the derivative dκ/ds has a finite value. The function J to compute this derivative dκ/ds is called a steering function.

Figure 11:
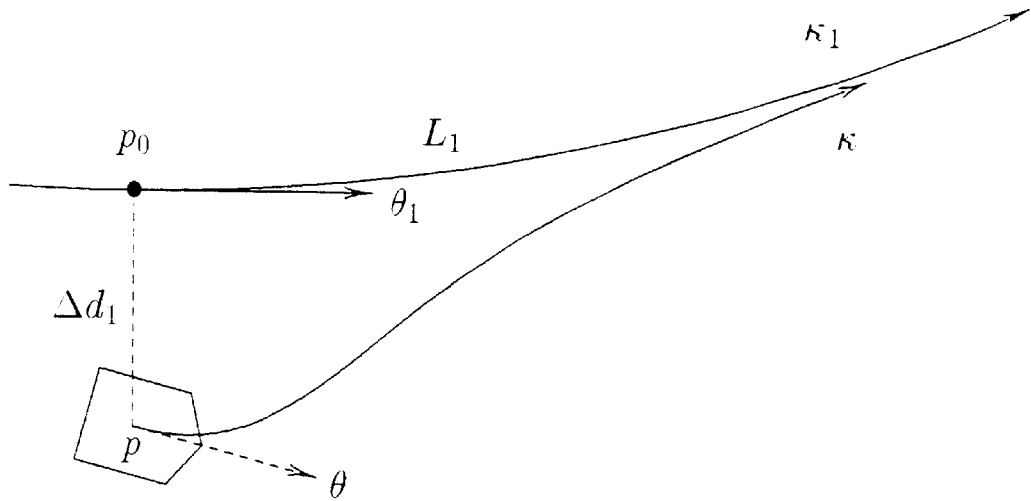
FIG. 11 depicts a situation where the steering function is applied to track a circular arc. In this specific case, $\Delta d_1 < 0$.

As seen in FIG. 1, this subsystem is supplied with the present vehicle configuration (q, κ)=((p, θ), κ) and the present vehicle speed υ from the Vehicle-Configuration Estimation Subsystem, and the present segment $L_1$ from the Path Buffer Subsystem. Let $p_0$ be the closest point on $L_1$ from the vehicle position p [FIG. 11]). The steering function J to track a segment $L_1$ is $$\frac{d\kappa}{ds} = J(L_1) = -a\Delta\kappa - b\Delta\theta - c\Delta d_1 \quad (8)$$
$$= -a(\kappa - \kappa_1) - b(\theta - \theta_1) - c\Delta d_1$$

where κ is the vehicle's curvature, θ is the vehicle's heading orientation, $\kappa_1$ is the curvature of $L_1$, $\theta_1$ is the tangential orientation of $L_1$ at $p_0$, and $\Delta d_1$ is the signed distance from p to $p_0$. The computation algorithm for $\theta_1$ and $\Delta d_1$ are described in Subsection [3.1]. The three terms in the right side of this steering function work as negative feedback for the curvature error, orientational error, and positional error respectively. Positive constants a, b, and c are called feedback gains, which are defined through a single positive constant k as follows:

$$a = 3k$$
$$b = 3k^2 - \kappa_1^2$$
$$c = k^3 - 3k\kappa_1^2. \quad (9)$$

The soundness of this selection of the feedback gains is given in the following Subsections, [3.3] and [3.4]. The reciprocal of k is denoted by σ and is called smoothness:

$$\sigma = \frac{1}{k}. \quad (10)$$

With a larger σ, the trajectory of the vehicle becomes smoother; with a smaller σ, the trajectory becomes sharper. This simple controllability of smoothness is one of the major advantages of this invention for path tracking.

After calculating the steering function $J(L_1)$, a commanded curvature $\kappa_c$ is calculated by $$\kappa_c = \kappa + J(L_1)\Delta s. \quad (11)$$

This commanded curvature $\kappa_c$ is output to the Vehicle-Dependent Subsystem.

[3.1] Computation of $\theta_1$ and $\Delta d_1$

Figure 12:
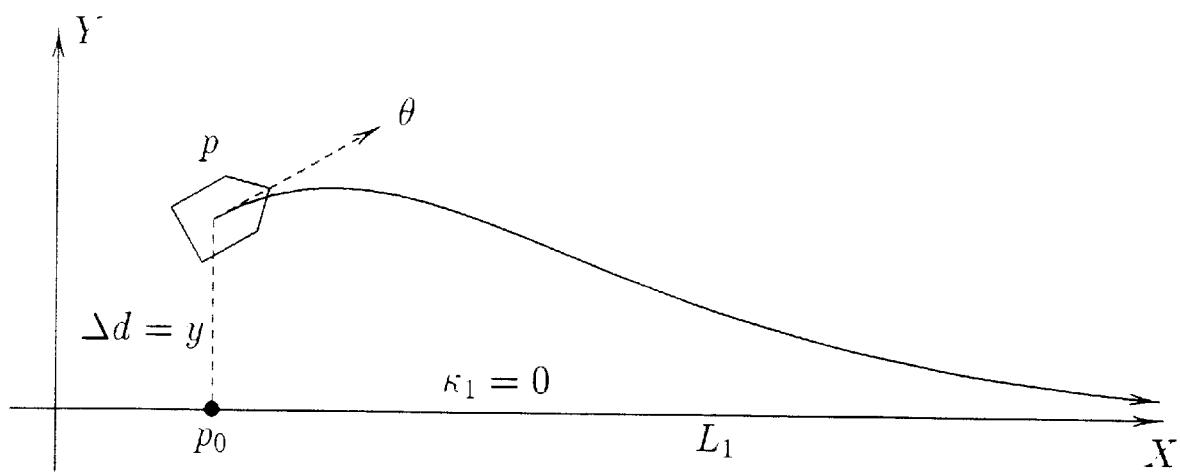
FIG. 12 shows a situation where the vehicle is supposed to track the X-axis in the positive direction. In this specific case $\Delta d_1 = y > 0$.

The sign (+ or −) of $\Delta d_1$ is defined as follows: $\Delta d_1 > 0$ if p (vehicle position) is on the left side of $L_1$ [FIG. 12], $\Delta d_1 < 0$ if p is on the right side of $L_1$ [FIG. 11], and $\Delta d_1 = 0$ if p is on $L_1$. Now the tangential orientation $\theta_1$ and signed distance $\Delta d_1$ are calculated as follows:

(i) If $L_1$ is a straight line, $\theta_1$ is given as one component of the line definition itself; i.e., $L_1 = (x_1, y_1, \theta_1)$. The signed distance $\Delta d_1$ is computed as $$\Delta d_1 = -(x - x_1)\sin\theta_1 + (y - y_1)\cos\theta_1. \quad (12)$$

See: Kanayama, Y., MacPherson, D. L., and Krahn, G. W., "Two Dimensional Transformations and Its Application to Vehicle Motion Control and Analysis," 1993 Proceedings of International Conference on Robotics and Automation, in Atlanta, Ga., May 2–7, pp. 13–18, 1993.

(ii) If $L_1$ is a circular arc and is represented by the first representation [FIG. 3]; i.e., a configuration $(p_1, \theta_1, \kappa_1)$, this is translated into the second representation by $$r_1 = \frac{1}{\kappa_1} \quad (13)$$

$$(x_{c1}, y_{c1}) = (x_1 - r_1\sin\theta_1, y_1 + r_1\cos\theta_1). \quad (14)$$

As stated in Section [2], the sign of $r_1$ tells the orientation of the circular arc: counterclockwise or clockwise. Then the tangential orientation $\theta_1$ and signed distance $\Delta d_1$ are $$\theta_1 = \arctan 2(y_{c1} - y, x_{c1} - x) - \frac{\pi}{2}, \quad (15)$$

if $r_1 > 0$, $$\theta_1 = \arctan 2(y_{c1} - y, x_{c1} - x) + \frac{\pi}{2}, \quad (16)$$

if $r_1 < 0$, $$\Delta d_1 = r_1 - \sqrt{(x_{c1} - x)^2 + (y_{c1} - y)^2}, \quad (17)$$

if $r_1 > 0$, $$\Delta d_1 = r_1 + \sqrt{(x_{c1} - x)^2 + (y_{c1} - y)^2}, \quad (18)$$

This concludes the computation of $\theta_1$ and $\Delta d_1$.

[3.2] Speed control method

We assume that a default speed $\upsilon_0$ and a default acceleration $\mu$ are given. When the vehicle is tracking a circle with a radius r, the centrifugal force $f$ is $$f = \frac{mv^2}{r} = mv^2\kappa, \quad (19)$$

where m is the mass of the vehicle and κ is the circle's curvature. Furthermore, the maximum of the centrifugal force $f_{max}$ is also given for a situation where the vehicle is in a curved motion. Then $$mv^2\kappa \leq f_{max}, \quad (20)$$

and hence, the restriction on the speed υ due to the curvature is that $$v \leq \sqrt{\frac{f_{max}}{m\kappa}}. \quad (21)$$

Then the maximum speed $v_{max}$ in this situation is $$v_{max} = \min\left(v_0, \sqrt{\frac{f_{max}}{m\kappa}}\right). \quad (22)$$

If the present vehicle speed $v$ is less than this maximum speed, we accelerate the vehicle with the default acceleration $\mu$. Thus the commanded speed $v_c$ becomes $$v_c = \min(v + \mu \Delta t, v_{max}) \quad (23)$$

if $v \leq v_{max}$.

If the present vehicle speed $v$ is greater than this maximum speed, we decelerate the vehicle with the default acceleration $\mu$, $$v_c = \max(v - \mu \Delta t, v_{max}) \quad (24)$$

if $v \geq v_{max}$.

This commanded speed $v_c$ is the output to the Vehicle-Dependent Subsystem. The speed control method stated so far is only one of similar embodiments of the basic principle of reducing speed for a larger curvature.

[3.3] Linearization in Line Tracking

The purpose of this subsection is to prove the theoretical soundness of the feedback gains (a, b, c) given in Equations (9). Since this section deals with the line tracking case, $\kappa_1 = 0$ and the feedback gains becomes $a=3k$, $b=3k^2$, and $c=k^3$. To make the linearization task simpler, we take the global X-axis as the line $L_1$ to be tracked [FIG. 12]. The steering function Equation (8) becomes $$\frac{d\kappa}{ds} = J(L_1) = -a\kappa - b\theta - cy, \quad (25)$$

since $\Delta d_1 = y$ and $\Delta \kappa = \kappa$.

We temporarily impose the condition $$|\theta| < \frac{\pi}{2}$$

in applying the linearization method. We write the steering function as a system of first order equations by using the following variables:

$$x = \begin{pmatrix} x_1 \\ x_2 \\ x_3 \end{pmatrix} = \begin{pmatrix} y(x) \\ y'(x) \\ y''(x) \end{pmatrix}, \quad (26)$$

we would like to have the form $$\dot{x} = f(x), \quad (27)$$

where the dot denotes differentiation with respect to x. We represent all the variables in the steering function in terms of $x_1$ to $x_3$.

$$y = x_1 \quad (28)$$

$$\theta = \tan^{-1} y' = \tan^{-1} x_2 \quad (29)$$

$$\kappa = \frac{d\theta}{ds} = \frac{d\theta/dx}{ds/dx} = \frac{y''}{(1+y'^2)^{3/2}} = \frac{x_3}{(1+x_2^2)^{3/2}} \quad (30)$$

$$\frac{d\kappa}{ds} = \frac{d\kappa/dx}{ds/dx} = \frac{\frac{d}{dx}\left(\frac{y''}{(1+y'^2)^{3/2}}\right)}{\sqrt{1+y'^2}} \quad (31)$$

$$= y'''(1+y'^2)^{-2} - 3y'y''^2(1+y'^2)^{-3}$$

$$= \dot{x}_3(1+x_2^2)^{-2} - 3x_2 x_3^2(1+x_2^2)^{-3}$$

By substituting these results into the steering function Equation (25), we obtain $$\dot{x}_3(1+x_2^2)^{-2} - 3x_2 x_3^2(1+x_2^2)^{-3} = -\frac{ax_3}{(1+x_2^2)^{3/2}} - b\tan^{-1} x_2 - cx_1. \quad (32)$$

Now we have $$\dot{x}_1 = y' = x_2 = f_1 \quad (33)$$

$$\dot{x}_2 = y'' = x_3 = f_2 \quad (34)$$

$$\dot{x}_3 = y''' = 3x_2 x_3^2 (1+x_2^2)^{-1} - ax_3(1+x_2^2)^{1/2} - b(1+x_2^2)^2 \tan^{-1} x_2 - cx_1(1+x_2^2)^2 = f_3, \quad (35)$$

where $f = [f_1, f_2, f_3]^T$ clearly satisfies $f(0)=0$. We linearize the system by using the Jacobian of $$M = \left[\frac{\partial f}{\partial x}\right]_{x=0} = \begin{bmatrix} \frac{\partial f_1}{\partial x_1} & \frac{\partial f_1}{\partial x_2} & \frac{\partial f_1}{\partial x_3} \\ \frac{\partial f_2}{\partial x_1} & \frac{\partial f_2}{\partial x_2} & \frac{\partial f_2}{\partial x_3} \\ \frac{\partial f_3}{\partial x_1} & \frac{\partial f_3}{\partial x_2} & \frac{\partial f_3}{\partial x_3} \end{bmatrix}_{x=0} = \begin{bmatrix} 0 & 1 & 0 \\ 0 & 0 & 1 \\ -c & -b & -a \end{bmatrix} \quad (36)$$

The Lyapunov's indirect method informs us that the nature of the eigenvalues of matrix M determines the stability properties of the system. More precisely, the method states that the equilibrium point 0 is uniformly asymptotically stable if all the eigenvalues of M have negative real parts. For our problem, the eigenvalues $\lambda$ of M satisfies the equation, $\lambda^3 + a\lambda^2 + b\lambda + c = 0$. In this invention we take all the eigenvalues to be equal to one negative value $-k$. Thus we have the equations $a=3k$, $b=3k^2$, and $c=k^3$, concluding the proof. The advantage of using this critical damping relation is clearly seen in the simulation and experimental results shown later.

[3.4] Linearization in Circle Tracking

The purpose of this subsection is to prove the theoretical soundness of the feedback gains (a, b, c) given in Equations (9), in the circle-tracking case. We linearize the system after converting the whole geometrical relations into a polar coordinate system.

Figure 13:
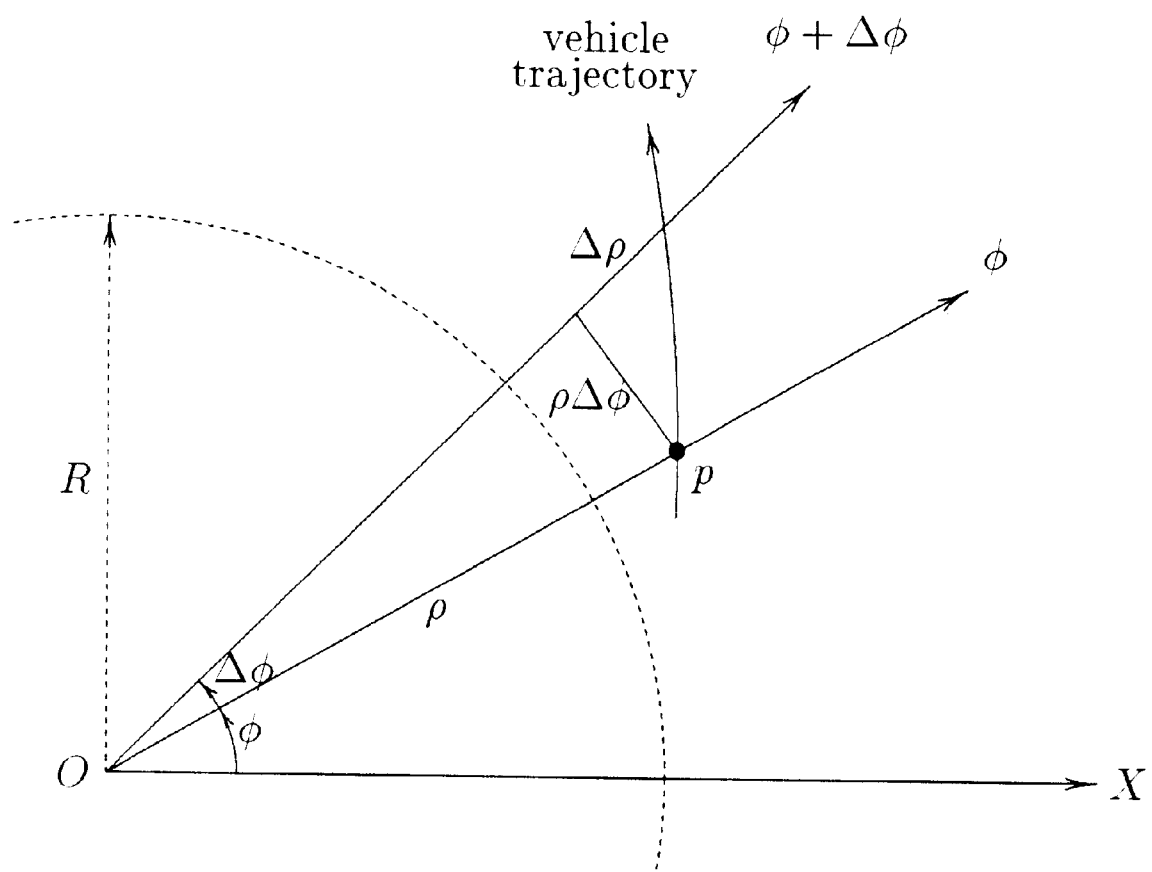
FIG. 13 depicts a vehicle situation in a polar coordinate system. A point p is represented by ($\phi$, $\rho$) in the polar coordinate system.

For a given circle, we define a polar coordinate system with the pole O at its circle center [FIG. 13]. A ray OX is determined in an arbitrary manner. The vehicle position p in the original Cartesian coordinate system is translated into an equation $\rho = \rho(\phi)$ (>0) where $\phi$ is the angle $\angle pOX$ and $\rho$ is the distance from O to p as a function of $\phi$. We assume that $\rho$ is a single valued function: $\Re \to \Re$ [See FIG. 13]. Now the variable, s, $\theta$, $\kappa$, and others must be translated into the variable of $\rho$ as a function of $\phi$.

The derivative of trajectory length s with respect to $\phi$ is evaluated as:

$$\frac{\Delta s}{\Delta \phi} = \frac{\sqrt{(\rho\Delta\phi)^2 + (\Delta\rho)^2}}{\Delta\phi} = \sqrt{\rho^2 + \left(\frac{\Delta\rho}{\Delta\phi}\right)^2}. \quad (37)$$

Therefore, $$\frac{ds}{d\phi} = (\rho^2 + \rho'^2)^{1/2}. \quad (38)$$

The tangential direction $\theta$ of the vehicle trajectory is $$\theta = \phi + \tan^{-1}\left(\frac{\rho\Delta\phi}{\Delta\rho}\right) \Rightarrow \phi + \tan^{-1}\left(\frac{\rho}{\rho'}\right). \quad (39)$$

Thus, its curvature $\kappa$, the derivative of $\theta$ with respect to s, becomes $$\kappa = \frac{d\theta}{ds} = \frac{\frac{d\theta}{d\phi}}{\frac{ds}{d\phi}} = \left(1 + \frac{\frac{\rho'\rho' - \rho\rho''}{\rho'^2}}{1 + \left(\frac{\rho}{\rho'}\right)^2}\right)(\rho^2 + \rho'^2)^{-\frac{1}{2}} \quad (40)$$

$$= \left(1 + \frac{\rho'^2 - \rho\rho''}{\rho^2 + \rho'^2}\right)(\rho^2 + \rho'^2)^{-\frac{1}{2}} = (\rho^2 + 2\rho'^2 - \rho\rho'')(\rho^2 + \rho'^2)^{-\frac{3}{2}}.$$

The derivative

The derivative $\dfrac{d\kappa}{ds}$ of curvature is $$\frac{d\kappa}{ds} = \frac{\frac{d\kappa}{d\phi}}{\frac{ds}{d\phi}} \quad (41)$$

$$= ((2\rho\rho' + 4\rho'\rho'' - \rho'\rho'' - \rho\rho''')(\rho^2 + \rho'^2)^{-\frac{3}{2}} -$$

$$\frac{3}{2}(\rho^2 + \rho'^2)^{-\frac{5}{2}}(2\rho\rho' + 2\rho'\rho'')(\rho^2 + 2\rho'^2 - \rho\rho''))(\rho^2 + \rho'^2)^{-\frac{1}{2}}$$

$$= (2\rho\rho' + 3\rho'\rho'' - \rho\rho''')(\rho^2 + \rho'^2)^{-2} -$$

$$3\rho'(\rho + \rho'')(\rho^2 + 2\rho'^2 - \rho\rho'')(\rho^2 + \rho'^2)^{-3}.$$

of curvature is $d\kappa/ds = d\kappa/d\phi/ds/d\phi = ((2\rho\rho'+4\rho'\rho''-\rho'\rho''-\rho\rho''')(\rho^2+\rho'^2)^{-3/2-3/2}$ $(\rho^2+\rho'^2)^{-5/2}(2\rho\rho'+2\rho'\rho'')(\rho^2+2\rho'^2-\rho\rho''))(\rho^2+\rho'^2)^{-1/2}$ $=(2\rho\rho'+3\rho'\rho''-\rho\rho''')(\rho^2+\rho'^2)^{-2}-3\rho'(\rho+\rho'')(\rho^2+2\rho'^2-\rho\rho'')(\rho^2+\rho'^2)^{-3}.$ (41)

On the other hand, by the steering function (Equation (8)) we have $$\frac{d\kappa}{ds} = -a(\kappa - \kappa_1) - b(\theta - \theta_1) - c(R - \rho) \quad (42)$$

$$= -a((\rho^2 + 2\rho'^2 - \rho\rho'')(\rho^2 + \rho'^2)^{-\frac{3}{2}} -$$

$$R^{-1}) - b\left(\phi + \tan^{-1}\left(\frac{\rho}{\rho^1}\right) - \left(\phi + \frac{\pi}{2}\right)\right) - c(R - \rho)$$

-continued $$= -a((\rho^2 + 2\rho'^2 - \rho\rho'')(\rho^2 + \rho'^2)^{-\frac{3}{2}} -$$

$$R^{-1}) + b\tan^{-1}\left(\frac{\rho'}{\rho}\right) - c(R - \rho).$$

Therefore, by Equations (41) and (42), the following holds:

$$-a\left((\rho^2 + 2\rho'^2 - \rho\rho'')(\rho^2 + \rho'^2)^{-\frac{3}{2}} - R^{-1}\right) + b\tan^{-1}\left(\frac{\rho'}{\rho}\right) - c(R - \rho) = \quad (43)$$

$$(2\rho\rho' + 3\rho'\rho'' - \rho\rho''')(\rho^2 + \rho'^2)^{-2} -$$

$$3\rho'(\rho + \rho'')(\rho^2 + 2\rho'^2 - \rho\rho'')(\rho^2 + \rho'^2)^{-3},$$

which yields $$-2\rho\rho' - 3\rho'\rho'' + \rho\rho''' = \quad (44)$$

$$-3\rho'(\rho + \rho'')(\rho^2 + 2\rho'^2 - \rho\rho'')(\rho^2 + \rho'^2)^{-1} +$$

$$a\left((\rho^2 + 2\rho'^2 - \rho\rho'')(\rho^2 + \rho'^2)^{-\frac{1}{2}} - R^{-1}(\rho^2 + \rho'^2)^2\right) -$$

$$b\tan^{-1}\left(\frac{\rho'}{\rho}\right)(\rho^2 + \rho'^2)^2 - c(\rho - R)(\rho^2 + \rho'^2)^2.$$

Finally we have $$\rho''' = 2\rho' + 3\rho^{-1}\rho'\rho'' - 3\rho'(1 + \rho^{-1}\rho'')(\rho^2 + 2\rho'^2 - \rho\rho'') \quad (45)$$

$$(\rho^2 + \rho'^2)^{-1} + a\rho^{-1}((\rho^2 + 2\rho'^2 - \rho\rho'')(\rho^2 + \rho'^2)^{\frac{1}{2}} -$$

$$R^{-1}(\rho^2 + \rho'^2)^2) - b\rho^{-1}\tan^{-1}\left(\frac{\rho'}{\rho}\right)(\rho^2 + \rho'^2)^2 -$$

$$c(1 - R\rho^{-1})(\rho^2 + \rho'^2)^2.$$

We express the original Equation (26) in terms of the following variables:

$$x \equiv \begin{pmatrix} x_1 \\ x_2 \\ x_3 \end{pmatrix} \equiv \begin{pmatrix} \rho - R \\ \rho' \\ \rho'' \end{pmatrix}. \quad (46)$$

We would like to have the form $$\dot{x} = f(x) \quad (47)$$

where the dot denotes differentiation with respect to $\phi$. By substituting the new variables into the previous results, we obtain $$\dot{x}_1 = \rho' = x_2 = f_1 \quad (48)$$

$$\dot{x}_2 = \rho'' = x_3 = f_2 \quad (49)$$

-continued $$\dot{x}_3 = \rho''' = 2x_2 + 3(x_1 + R)^{-1}x_2x_3 - \qquad (50)$$
$$3x_2(1 + (x_1 + R)^{-1}x_3)((x_1 + R)^2 2x_2^2 - (x_1 + R)x_3)$$
$$((x_1 + R)^2 + x_2^2)^{-1} + a(x_1 + R)^{-1}$$
$$\left(((x_1 + R)^2 + 2x_2^2 - (x_1 + R)x_3)((x_1 + R)^2 + x_2^2)^{\frac{1}{2}} - \right.$$
$$R^{-1}((x_1 + R)^2 + x_2^2)^2\right) -$$
$$b(x_1 + R)^{-1}\tan^{-1}\left(\frac{x_2}{(x_1 + R)}\right)((x_1 + R)^2 + x_2^2)^2 -$$
$$c(1 - R(x_1 + R)^{-1})((X_1 + R)^2 + x_2^2)^2 = f_3,$$

where $f=[f_1, f_2, f_3]$ clearly satisfies $$f(0)=0. \qquad (51)$$

To study the stability properties of the system of equations above, we study the linearized equation, $$\dot{x}=Mx, \qquad (52)$$

where $$M = \left[\frac{\partial f}{\partial x}\right]_{x=0} = \begin{bmatrix} \frac{\partial f_1}{\partial x_1} & \frac{\partial f_1}{\partial x_2} & \frac{\partial f_1}{\partial x_3} \\ \frac{\partial f_2}{\partial x_1} & \frac{\partial f_2}{\partial x_2} & \frac{\partial f_2}{\partial x_3} \\ \frac{\partial f_3}{\partial x_1} & \frac{\partial f_3}{\partial x_2} & \frac{\partial f_3}{\partial x_3} \end{bmatrix}_{x=0} \qquad (53)$$

For that purpose $$\left[\frac{\partial f_3}{\partial x_1}\right]_{x=0} = -aR - cR^3, \qquad (54)$$

$$\left[\frac{\partial f_3}{\partial x_2}\right]_{x=0} = -1 - bR^2, \qquad (55)$$

and $$\left[\frac{\partial f_3}{\partial x_3}\right]_{x=0} = -aR, \qquad (56)$$

or $$M = \begin{bmatrix} 0 & 1 & 0 \\ 0 & 0 & 1 \\ -aR - cR^3 & -1 - bR^2 & -aR \end{bmatrix} \qquad (57)$$

It can be easily shown that the eigenvalues $\lambda$ of M satisfy the characteristic equation, $$\lambda^3 + A\lambda^2 + B\lambda + C = 0 \qquad (58)$$

where $$A=aR, \; B=1+bR^2, \text{ and } C=aR+cR^3. \qquad (59)$$

By Lyapunov's indirect method the equilibrium point 0 is uniformly asymptotically stable if all the eigenvalues ($h_1$, $h_2$, and $h_3$) of M have negative real parts (See Vidyasagar, M., *Nonlinear Systems Analysis*, $2^{nd}$ Edition, Prentice Hall, New Jersey, 1993). In the case of tracking a circle, uniform asymptotic stability means the trajectory of an object with a certain initial configuration ultimately tracks a desired circle as closely as possible. The equilibrium point 0 of the steering function is uniformly asymptotically stable if A, B, and C are positive and AB>C. Note that the last condition on the coefficients is equivalent to the condition we obtained for the line tracking, namely, AB>C. To avoid oscillations in the solutions, we desire eigenvalues that are real and negative. Furthermore, as in the case of line tracking, if we take all the real eigenvalues ($h_1=h_2=h_3=h$) the same, we can express the coefficients in terms of the single parameter.

Therefore, by letting h=kR for some positive constant k, $$A=3(kR)=aR, \qquad (60)$$

$$B=3(kR)^2=1+bR^2, \qquad (61)$$

$$C=(kR)^3=aR+cR^3. \qquad (62)$$

Solving these simultaneous equations for a, b, and c, we obtain $$a = \frac{3kR}{R} = 3k \qquad (63)$$

$$b = \frac{3(kR)^2 - 1}{R^2} = 3k^2 - \kappa_1^2 \qquad (64)$$

$$c = \frac{(kR)^3 - 3(kR)}{R^3} = k^3 - 3k\kappa_1^2, \qquad (65)$$

with the circular path curvature $$\kappa_1 = \frac{1}{R}.$$

Thus we can conclude that for Equations (9), the equilibrium point O is uniformly asymptotically stable if $$a=3k, \; b=3k^3-\kappa_1^2, \; c=k^3-3k\kappa_1^2 \qquad (66)$$

for some positive constant k, and for an arbitrary curvature $\kappa_1$. This concludes the proof we needed.

[4] Neutral Segment-Switching Subsystem

Figure 7:
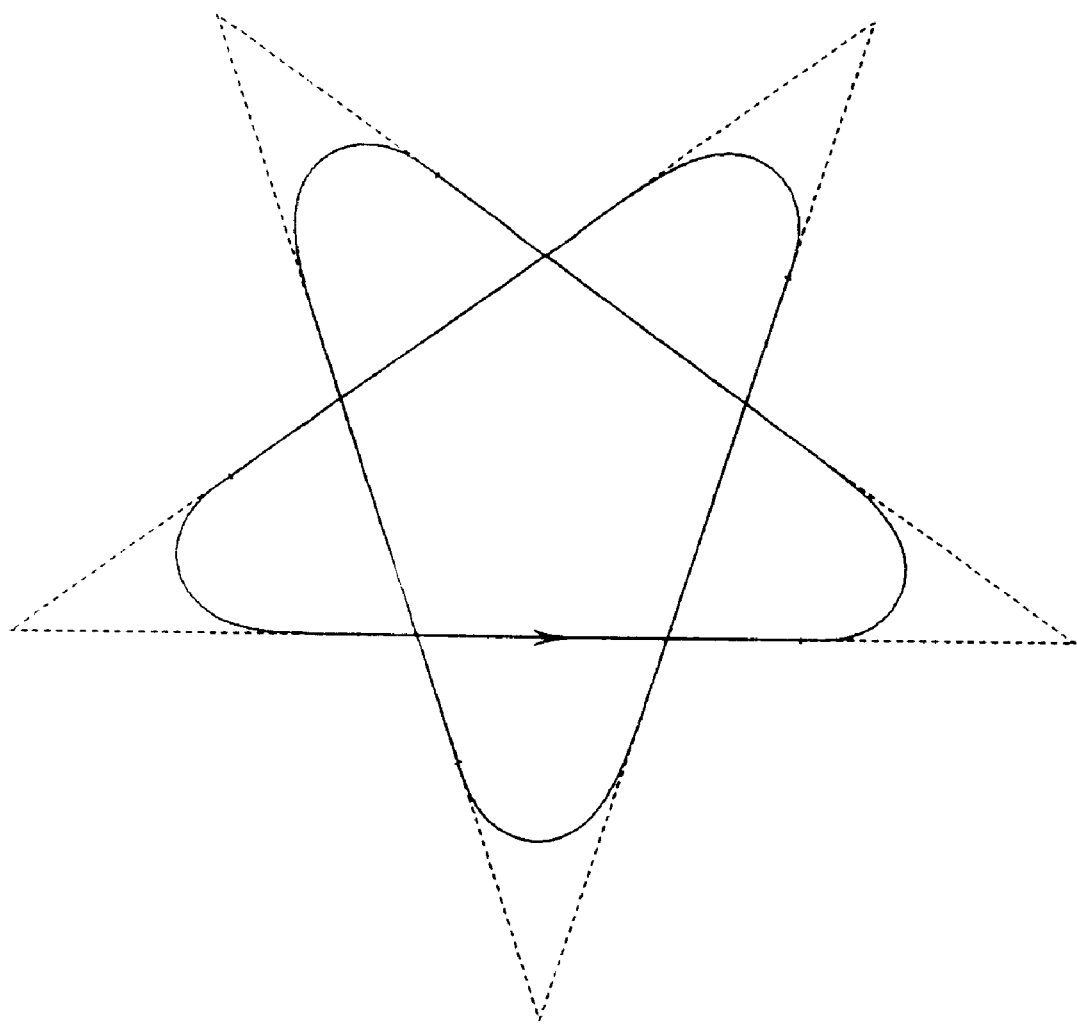
FIG. 7 depicts a vehicle's star-shaped motion behavior tracking the five directed lines that are shown in FIG. 5. The small ticks show the neutral-switching points.
Figure 8:
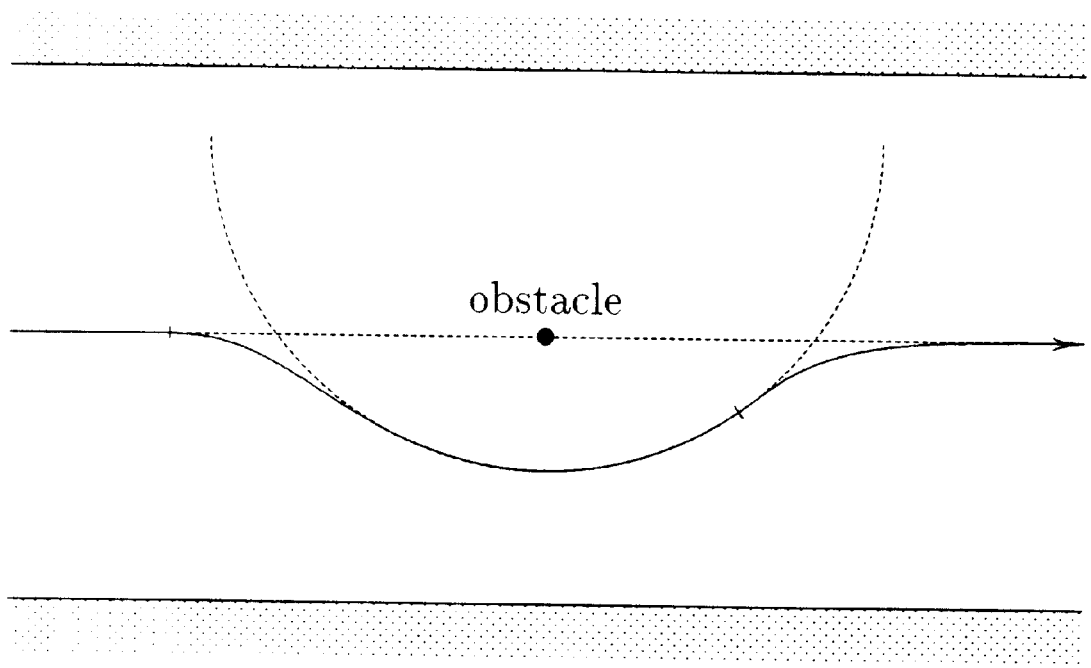
FIG. 8 depicts a vehicle's behavior in a hallway, where it is avoiding an obstacle using a path depicted in FIG. 6. The ticks show the neutral-switching points.

The next question is that, given a path consisting of multiple number of segments, where to switch from one segment to another to make reasonably smooth turns [FIG. 7 and FIG. 8]. For a certain period of time, a vehicle tracks a segment, but eventually it must start tracking the next segment. This decision is made by the Segment-Switching Test Subsystem. The input is the vehicle configuration (q, $\kappa$) and the segment $L_2$. The output is the switching-needed command.

Figure 14:
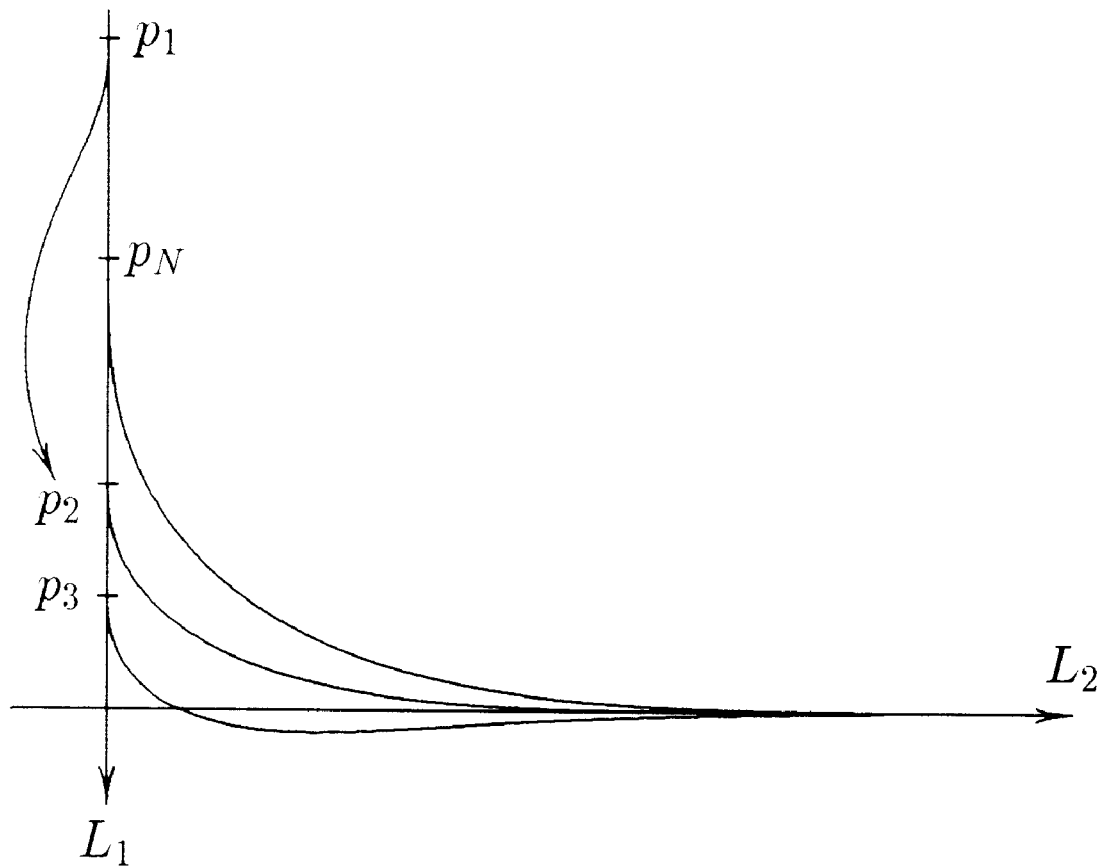
FIG. 14 depicts the vehicle's switching behaviors from one line to another leaving at several distinct switching points. Among them, $p_N$ denotes the neutral switching point.

Assume that a path sequence contains two directed lines, $L_1$ and $L_2$, as shown in FIG. 14. The vehicle first tracks $L_1$ until it comes to a point called a switching point and then it leaves $L_1$ to track $L_2$. FIG. 14 shows the paths obtained by leaving at several distinct points while the smoothness a is kept constant. If the vehicle leaves $L_1$ too soon (for instance, at $p_1$), the vehicle's initial motion even turns away from $L_2$'s direction. If it leaves $L_1$ too late (for instance, at $p_2$ or $p_3$), its curvature becomes larger and its trajectory even may intersect $L_2$. Both behaviors are not acceptable.

The sign (+ or −) and value of the steering function $J(L_2)$ change while the vehicle travels along $L_1$. We call a point $p_N$ on $L_1$ a neutral switching point if $J(L_2)-J(L_1)=0$ at the point. The method of leaving $L_1$ at the neutral point is called neutral switching. This has obvious advantages, such as, (1)

the trajectory obtained by the neutral switching method makes the maximum curvature along the trajectory minimum, (2) the trajectory obtained by the neutral switching method is more symmetric than any other trajectory, and (3) the vehicle does not make an initial turn in the opposite direction as happens when the vehicle leaves the original segment $L_1$ too early, and (4) not only the curvature $\kappa$, but also the derivative $$\frac{d\kappa}{ds}$$

becomes continuous (that means the motion is smoother). We claim this method as one component of this invention.

In case both $L_1$ and $L_2$ are straight lines, we can find $\Delta d$ for the neutral switching point as follows (notice that $\Delta \kappa = 0$).

$$\frac{d\kappa}{ds} = J(L_2) = -a\Delta\kappa - b\Delta\theta - c\Delta d \qquad (67)$$
$$= -b\Delta\theta - c\Delta d = 0.$$

Therefore $$\Delta d = -\frac{b\Delta\theta}{c} = -\frac{3k^2\Delta\theta}{k^3} = -\frac{3\Delta\theta}{k} \qquad (68)$$
$$= -3(\theta_1 - \theta_2)\sigma = 3(\theta_2 - \theta_1)\sigma.$$

For instance, if $\theta_2 - \theta_1 = \frac{\pi}{2}$, as shown in FIG. 14, $$\Delta d = \frac{3\pi\sigma}{2} = 4.712\sigma.$$

[5] Vehicle-Dependent Subsystem

This subsystem is a combination of the vehicle mechanisms/hardware and the related software components. Its global input is the commanded curvature $\kappa_c$ and speed $\upsilon_c$ (sent from the Continuous-Curvature Motion Calculation Subsystem), and its global output is the incremental movement $\Delta s$ and orientation change $\Delta\theta$ (sent to the Vehicle-Configuration Estimation Subsystem) [FIG. 1]. This subsystem naturally contains the vehicle itself. To accommodate the differences among vehicle's individual architectures, this subsystem contains two interfacing subroutines: Interface routines (I) and (II). These two routines help the other subsystems to be vehicle-independent.

To give a more realistic picture of an embodiment, a detailed description of operations is given in Section [5.1] using the "differential-drive" wheel architecture. The modes of operations for the "bicycle," and "car-like" vehicle architecture are also described in Sections [5.2] and [5.3].

[5.1] Embodiment for Differential-Drive Vehicle

Figure 15:
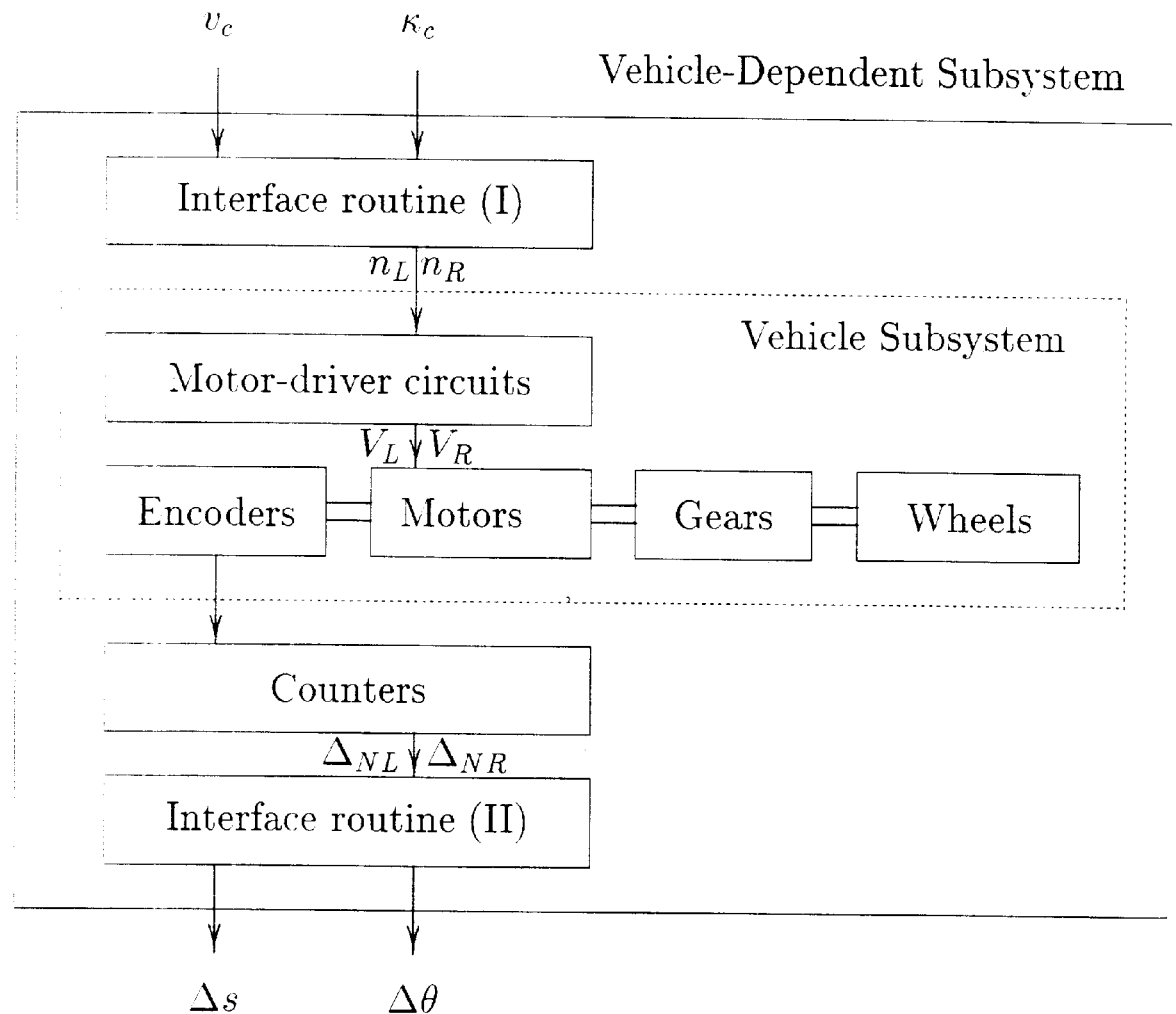
FIG. 15 depicts a detailed architecture of the Vehicle-Dependent Subsystem for the differential-drive wheel architecture.
Figure 16:
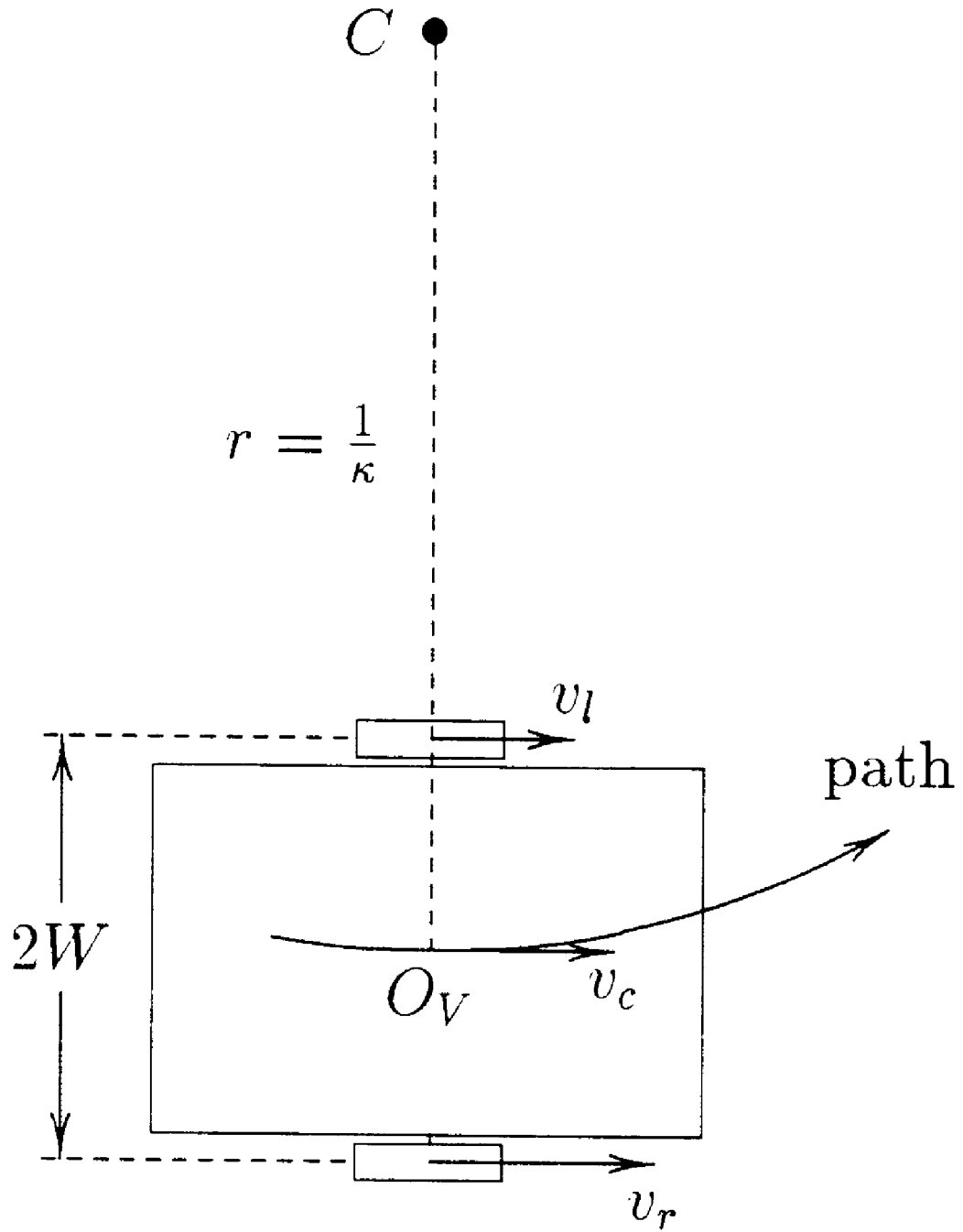
FIG. 16 depicts the wheel architecture of a differential-drive vehicle whose motion is controlled by two independently-driven wheels.

A detailed architecture of the Vehicle-Dependent Subsystem for the differential-drive wheel architecture is shown in FIG. 15. FIG. 16 shows the kinematic architecture of a differential-drive vehicle having two independent driving wheels, whose axles are co-linear. Let 2W be the distance between both wheels. Although one or more casters are needed to guarantee the vehicle's balance, they are not shown in the figure. We take the origin of the vehicle's coordinate system at the middle of the two driving wheels and its X-axis aligned to the vehicle's heading direction. FIG. 16 clarifies that the right and left wheel's driving speeds, $\upsilon_R$ and $\upsilon_L$, must satisfy $$\frac{\upsilon_R}{r+W} = \frac{\upsilon_L}{r-W} = \frac{\upsilon_c}{r}, \qquad (69)$$

where $\upsilon_c$ is the vehicle's commanded speed, and r the radius $$\left(=\frac{1}{\kappa_c}\right)$$

assuming $\kappa_c \neq 0$.
Therefore, $$\upsilon_R = \frac{r+W}{r}\upsilon_c = (1+W\kappa_c)\upsilon_c, \qquad (70)$$

$$\upsilon_L = \frac{r-W}{r}\upsilon_c = (1-W\kappa_c)\upsilon_c. \qquad (71)$$

Thus the motion command ($\upsilon_c$, $\kappa_c$) is converted into the vehicle's two control variables ($\upsilon_R$, $\upsilon_L$).

From $\upsilon_R$ and $\upsilon_L$, we compute digital numbers $n_{OL}$ and $n_{OR}$ to be supplied to two Digital to Analog (DA) converters so that the DA converters supply appropriate voltages. Then we convert the digital numbers $n_{OL}$ and $n_{OR}$ into analog voltages, $V_L$ and $V_R$, which are supplied to two motors in the vehicle subsystem, and driving the left motor and the right motor with $V_L$ and $V_R$ as shown in the "Motor-driver circuits" in FIG. 15. These tasks are done in Interface Routine (I) in FIG. 15.

The following tasks are executed by Interface Routine (II) in FIG. 15. Pulses are sent from the encoders to the encoder reading counters, then the incremental pulse count $\Delta_{NL}$ from the left encoder, and the incremental pulse count $\Delta_{NR}$ from the right encoder for the last sampling interval are obtained. Then the left wheel's incremental motion $\Delta d_L$ and the right wheel's incremental motion $\Delta d_R$ are computed as $$\Delta d_L = \left(\frac{\Delta_{NL}}{N}\right) \cdot \left(\frac{1}{G}\right) \cdot (\pi d), \qquad (72)$$

$$\Delta d_R = \left(\frac{\Delta_{NR}}{N}\right) \cdot \left(\frac{1}{G}\right) \cdot (\pi d), \qquad (73)$$

where N is the number of pulses generated by the encoder for one complete turn, G is the gear ratio, and d is the diameter of the wheel.

Lastly the incremental vehicle movement distance $\Delta s$ at the vehicle center and the incremental vehicle heading change $\Delta\theta$ during the previous sampling time interval $\Delta t$ are computed as $$\Delta s = \frac{\Delta d_R + \Delta d_L}{2}, \qquad (74)$$

$$\Delta\theta = \frac{\Delta d_R - \Delta d_L}{2W}. \qquad (75)$$

This concludes the task of Interface routine (II) in FIG. 15.

[5.2] Embodiment for Bicycle

Figure 17:
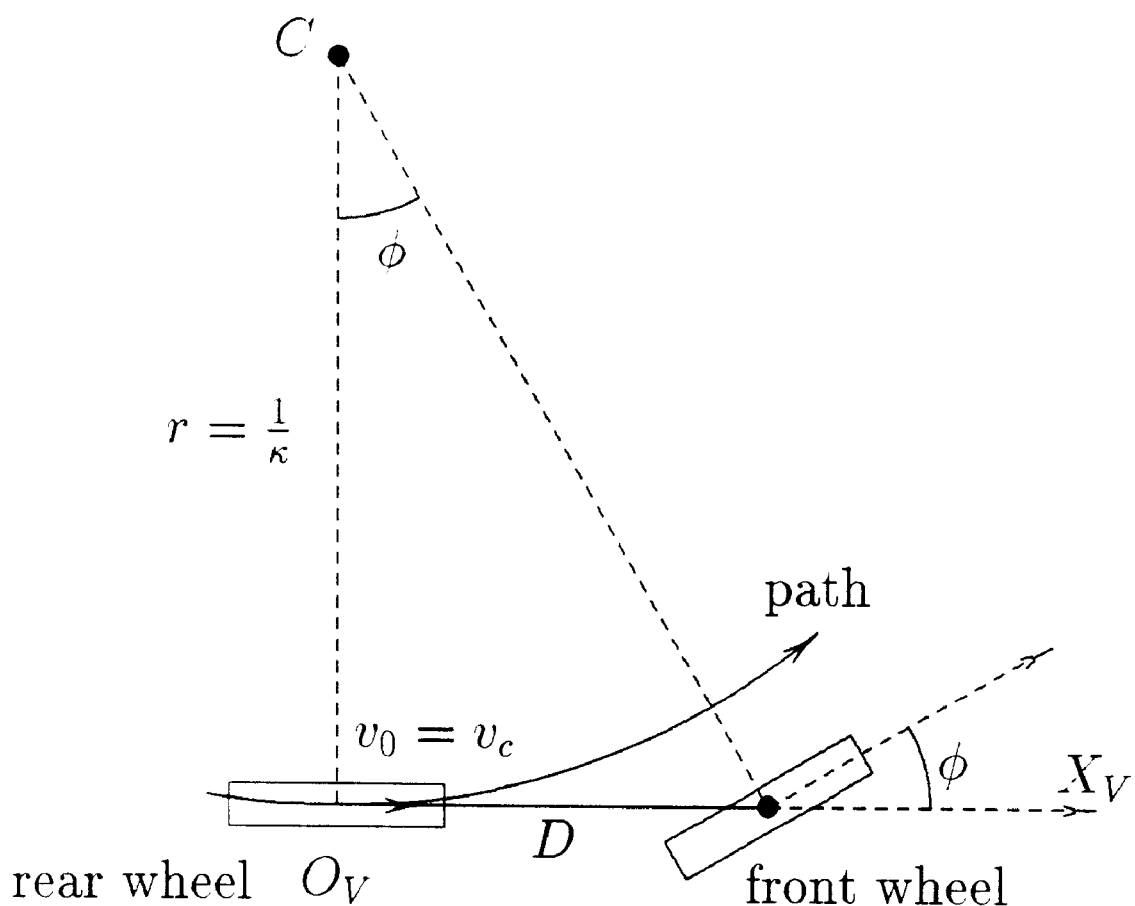
FIG. 17 depicts the wheel architecture of a bicycle whose motion is controlled by a steering front wheel and a driving rear wheel.

A bicycle has one front-steering wheel and one rear-driving wheel [FIG. 17]. Let D be the distance between both wheels. The origin for the vehicle coordinate system is set at the rear wheel and its X-axis is defined as the direction from the rear to the front wheel. Therefore, the steering angle $\phi$ is given by $$\tan \phi = \frac{D}{r} = D\kappa_c, \quad (76)$$

and hence $$\phi = \tan^{-1}(D\kappa_c) \quad (77)$$

Obviously, the rear wheel's driving speed $\upsilon_0$ must be equal to the commanded speed $\upsilon_c$:

$$\upsilon_0 = \upsilon_c. \quad (78)$$

Thus, the commanded motion ($\upsilon_c$, $\kappa_c$) is converted into the vehicle control variable set, ($\phi$, $\upsilon_0$).

[5.3] Embodiment for Car-Like Vehicle.

Figure 18:
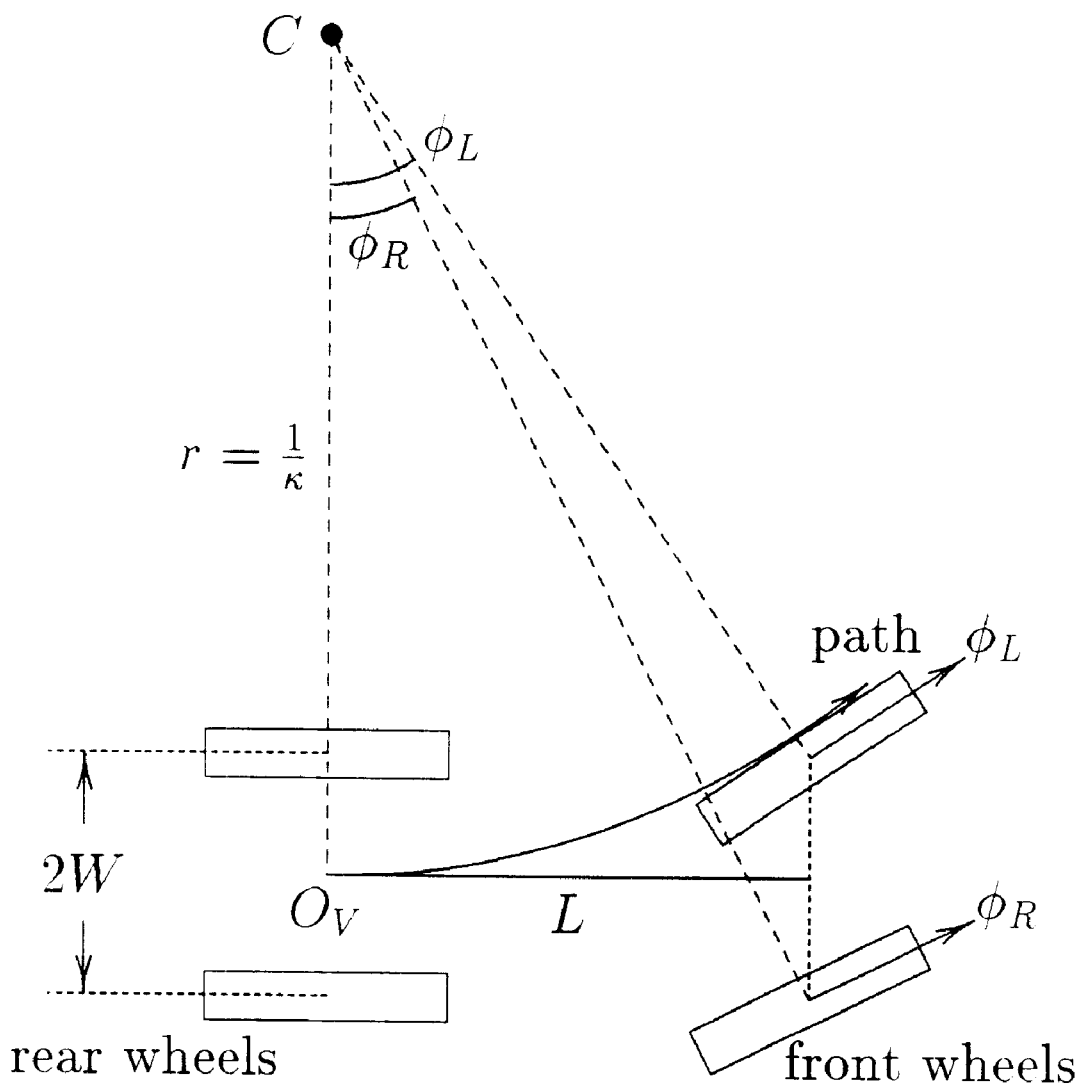
FIG. 18 depicts the wheel architecture of a car-like vehicle whose motion is controlled by two steering front wheels and two driving rear wheels.

A car-like vehicle has two steering front wheels and two driving rear wheels [FIG. 18]. Let D be the distance between the front and rear wheel axles and 2W be the distance between the left and right wheels in each wheel axle. The $Y_V$ axis is set to the rear wheel axle and the origin $O_V$ is set at the middle point of the two rear wheels.

Therefore, the steering angles $\phi_L$ and $\phi_R$ for the front-left and front-right wheels are given by $$\tan \phi_R = \frac{D}{r+W} = \frac{D\kappa_c}{1+W\kappa_c}, \quad (79)$$

$$\tan \phi_L = \frac{D}{r-W} = \frac{D\kappa_c}{1-W\kappa_c}, \quad (80)$$

and hence, $$\phi_R = \tan^{-1}\left(\frac{D\kappa_c}{1+W\kappa_c}\right), \quad (81)$$

$$\phi_L = \tan^{-1}\left(\frac{D\kappa_c}{1-W\kappa_c}\right). \quad (82)$$

The rear wheel's driving speeds, $\upsilon_R$ and $\upsilon_L$ are obtained by $$v_R = \frac{r+W}{r}v_c = (1+W\kappa_c)v_c. \quad (83)$$

$$v_L = \frac{r-W}{r}v_c = (1-W\kappa_c)v_c. \quad (84)$$

Thus, the commanded motion ($\upsilon_c$, $\kappa_c$) is converted into the Vehicle's control variable set ($\phi_R$, $\phi_L$, $\upsilon_R$, $\upsilon_L$).

From the embodiments for a bicycle and for a car-like vehicle, it is straight forward to introduce an embodiment scheme for a tricycle that has one steering front wheel and two driving rear wheels.

[5.4] Embodiment for Simulator

As a special case, we have a Vehicle-Dependent Subsystem that precisely embodies the commanded speed and commanded curvature. Since the commanded speed $\upsilon_c$ is precisely attained, $$\Delta s = \upsilon_c \Delta t, \quad (85)$$

and since the commanded curvature is also strictly attained, $$\Delta \theta = \kappa_c \Delta s = \kappa_c \upsilon_c \Delta t. \quad (86)$$

This special "Vehicle-Dependent System" is used for a simulator.

SIMULATION AND EXPERIMENTAL RESULTS

The following simulation and experimental results demonstrate the effectiveness, stability, precision, and robustness of vehicle behaviors controlled by this method.

Figure 19:
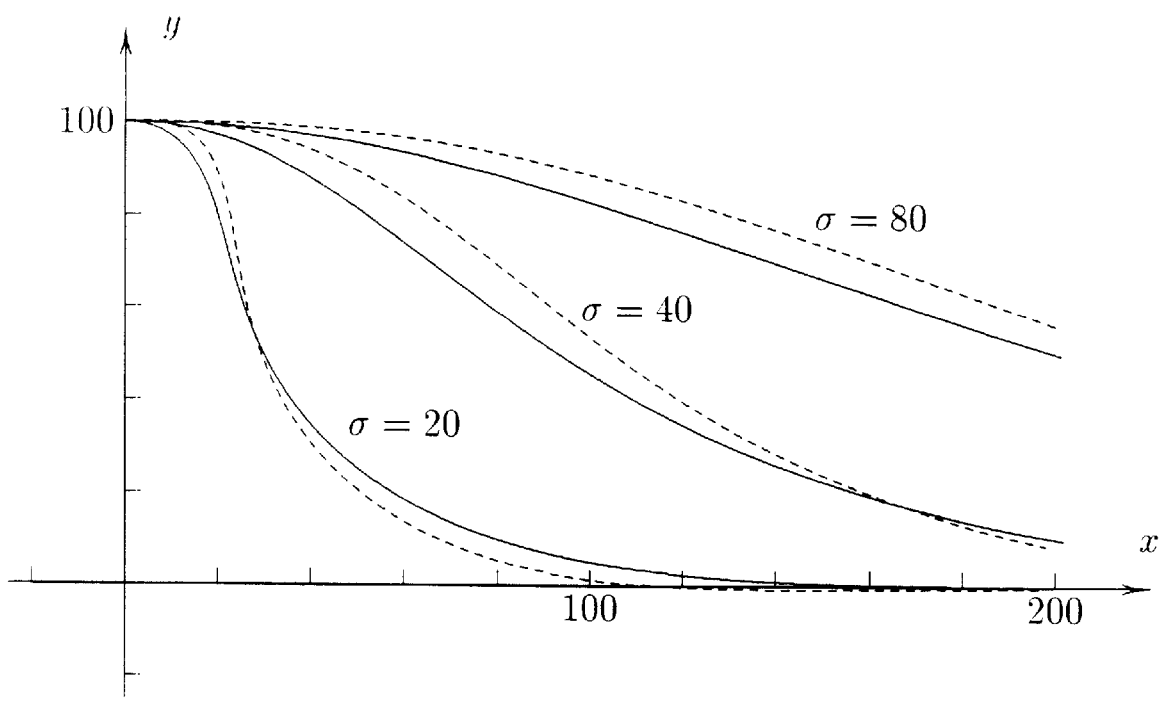
FIG. 19 depicts the vehicle's behavior ruled by the steering function. The vehicle is initially at a transformation of (0, 100, 0) and is supposed to track the X-axis. This figure demonstrates that distinct smoothness σ gives distinct behavior; a larger σ makes the behavior smoother. This figure also shows the comparisons between the simulation results (in solid lines) and the experimental results (in broken lines) by the autonomous vehicle Yamabico.

In FIG. 19, the vehicle has been tracking a straight line from the left, y=100, up to point (0,100). After leaving this point, it starts tracking the X-axis, y=0, with smoothness of σ=20, 40, and 80 respectively. A larger σ makes the behavior smoother. The solid lines are obtained numerical simulation and the broken lines are from the real experimental data by the autonomous robot Yamabico. These trajectories demonstrate the effect of using distinct smoothness. The experimental results are satisfactory.

Figure 20:
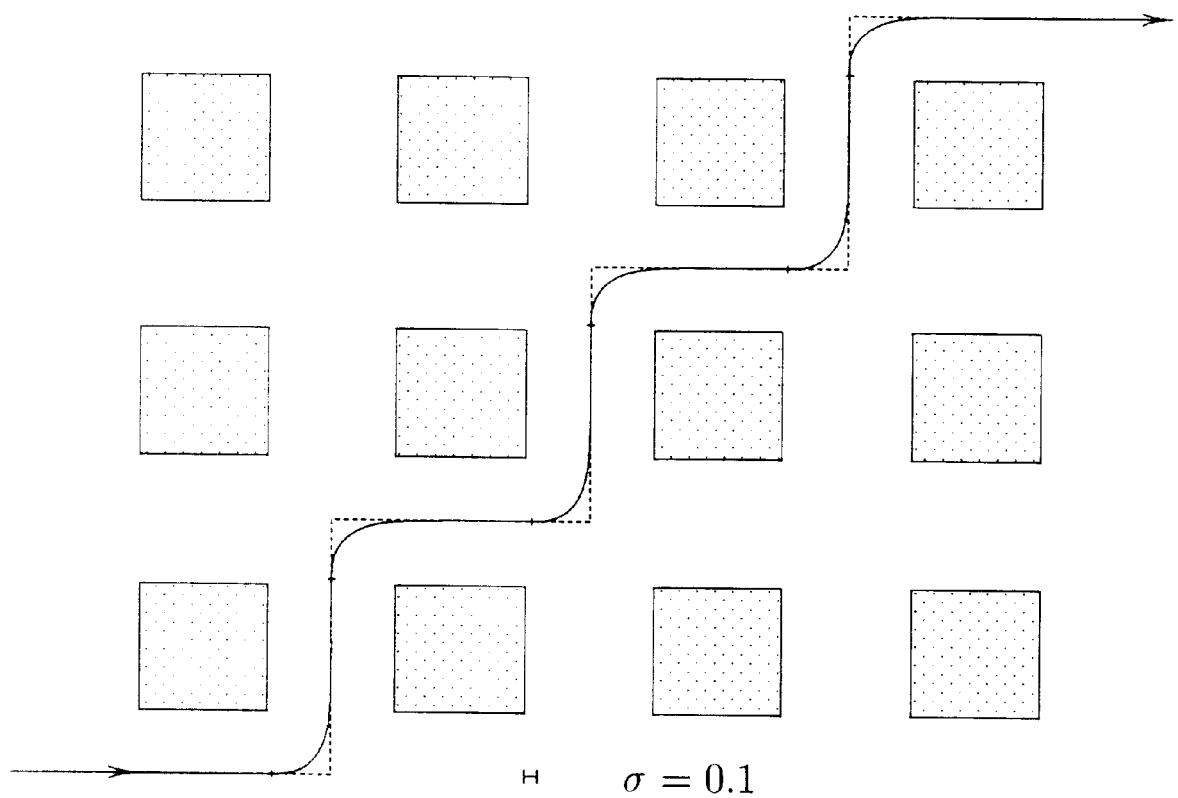
FIG. 20 depicts a vehicle's behavior of tracking a path consisting of several straight lines with the σ of smoothness of 0.1. Its size is shown in this Figure.

FIG. 20 depicts a vehicle's behavior of tracking a path consisting of several straight lines with the size (0.1) of smoothness σ in a street environment. The smoothness is 0.1, where the size of each block is 1. The small ticks show the neutral switching points.

Figure 21:
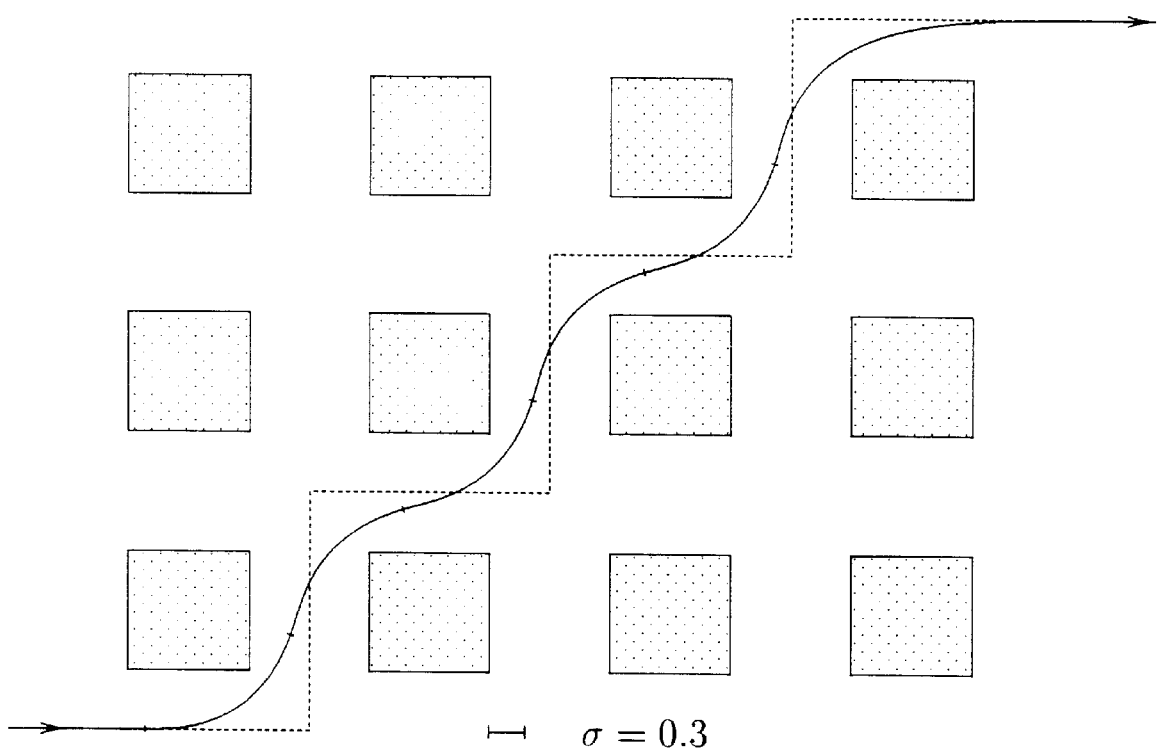
FIG. 21 is similar to FIG. 20 except for that the smoothness of 0.3 is used instead. Therefore, the behavior is smoother and is recommended for a faster motion. The size of smoothness is also shown here.

FIG. 21 is similar to FIG. 20 except that the smoothness is 0.3 instead of 0.1. Therefore, the behavior is smoother and is recommended for a faster motion.

Figure 22:
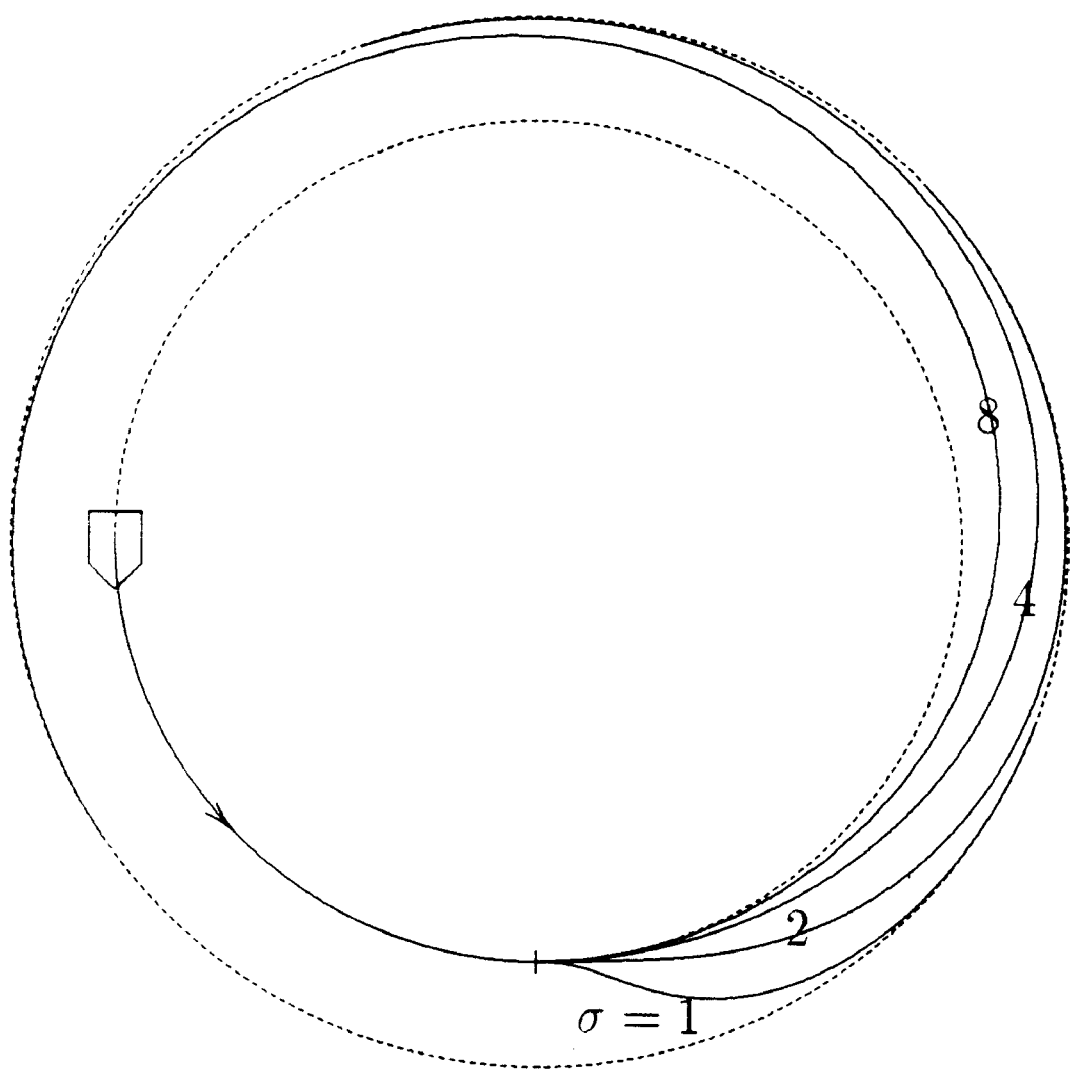
FIG. 22 is simulation results of tracking a circle with a radius of 10 after leaving the inside circle with a radius of 8, with smoothness of σ=1, 2, 4, and 8. Notice that each trajectory never intersects the target circle.

FIG. 22 is the simulation results of tracking a circle with a radius of 10 after leaving the inside circle with a radius of 8, with smoothness of σ=1, 2, 4, and 8. A larger σ makes its converging behavior slower. Notice that each trajectory never intersects the reference circle.

Figure 23:
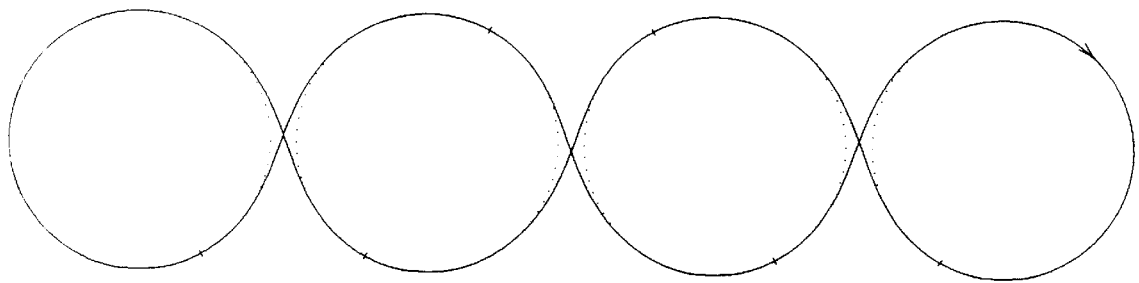
FIG. 23 depicts how this algorithm makes a vehicle track a series of circles. The first and third circles (from left) are counterclockwise and others are clockwise.

FIG. 23 depicts how this algorithm makes a vehicle track a series of circles. The first and third circles (from left) are counterclockwise and others are clockwise. Again the small ticks show the neutral switching points.

Obviously many modifications and variations of the present invention are possible in light of the above teachings. It is, therefore, to be understood that the present invention may be practiced within the scope of the claims other than as specifically described.

I claim:

1. An unmanned vehicle control system using a timer-interrupt-driven operation with an interval of Δt, the vehicle's position p, and heading orientation θ are defined in the world coordinate frame, a pair (p, θ) of the position and orientation is denoted as the vehicle transformation, the difference between a present vehicle transformation and its next transformation is denoted as the incremental transformation, the arc length Δs of the trajectory of the vehicle position p generated by a vehicle motion during an interval Δt is denoted as the vehicle incremental movement distance, and the orientation change Δθ of the vehicle heading orientation θ generated by a vehicle motion during an interval Δt is denoted as the vehicle incremental heading orientation change, comprising:

a computer control system for storing predetermined path data consisting of straight lines and circles, for calculating continuous-curvature motion, for making in-motion corrections using positional feedback, and for switching between the lines and circles; wherein the computer control system comprises:
a Vehicle-Independent Subsystem; and
a Vehicle-Dependent Subsystem connected to the Vehicle-Independent Subsystem;
wherein the Vehicle-Independent Subsystem further comprises;
a Vehicle-Configuration Estimation Subsystem connected to the Vehicle-Dependent Subsystem;
a Segment-Switching Test Subsystem connected to the Vehicle-Configuration Estimation Subsystem;

a Path Buffer Subsystem connected to the Segment-Switching Test Subsystem;

a Continuous-Curvature Motion Calculation Subsystem connected to the Vehicle-Configuration Estimation Subsystem, the Path Buffer Subsystem, and the Vehicle-Dependent Subsystem;

wherein the Vehicle-Configuration Estimation Subsystem receives input of the vehicle incremental movement distance $\Delta s$ and vehicle incremental heading orientation change $\Delta\theta$ from the Vehicle-Dependent Subsystem, computes the present vehicle transformation $q=(p,\theta)$ (position and orientation), trajectory curvature $\kappa$, and vehicle speed v, and then outputs these three items to the Continuous-Curvature Motion Calculation Subsystem and also outputs the present vehicle transformation $q=(p,\theta)$ (position and orientation), and trajectory curvature $\kappa$ to the Segment-Switching Test Subsystem;

wherein the Segment-Switching Test Subsystem receives the input of the present vehicle transformation $q=(p,\theta)$ and trajectory curvature $\kappa$ from the Vehicle-Configuration Estimation Subsystem and the second path segment $L_2$ (if any) from the Path Buffer Subsystem, computes a steering function J to track a path segment $L_i$, tests whether the signs of $J(L_1)$ and $J(L_2)$ are distinct, or $J(L_2)=0$, and, if the test is true, sends a switching-needed command to the Path Buffer Subsystem;

wherein the Path Buffer Subsystem stores a path in a form of a list $(L_1, L_2, \ldots)$ of path segments, where each path segment $L_i$ is a directed straight line segment or a directed circle segment, sends the present path segment $L_1$ to the Continuous-Curvature Motion Calculation Subsystem, sends the next path segment $L_2$ (if any), to the Segment-Switching Test Subsystem, and shifts the contents of the list when a switching-needed command is accepted from the Segment-Switching Test Subsystem, sending the next path segment, $L_2$, newly defined as $L_1$, to the Continuous-Curvature Motion Calculation Subsystem;

wherein the Continuous-Curvature Motion Calculation Subsystem receives the input of the present vehicle transformation $q=(p,\theta)$, trajectory curvature $\kappa$, and vehicle speed $\upsilon$ from the Vehicle-Configuration Estimation Subsystem, and receives the present path segment $L_1$ input from the Path Buffer Subsystem, computing a commanded path curvature $\kappa_c$ and commanded speed $\upsilon_c$, and sending these two values to the Vehicle-Dependent Subsystem; and wherein the Vehicle-Dependent Subsystem receives the commanded path curvature $\kappa_c$ and commanded speed $\upsilon_c$ from the Continuous-Curvature Motion Calculation Subsystem, executes low-level control tasks for motors, detects the vehicle incremental movement distance $\Delta s$ and vehicle incremental heading orientation change $\Delta\theta$, and sends them to the Vehicle-Configuration Estimation Subsystem.

2. The unmanned vehicle control system of claim 1, wherein the Vehicle-Dependent Subsystem is a differential-drive architecture.

3. The unmanned vehicle control system of claim 1, wherein the Vehicle-Dependent Subsystem is a bicycle-wheel architecture.

4. The unmanned vehicle control system of claim 1, wherein the Vehicle-Dependent Subsystem is a tricycle-wheel architecture.

5. The unmanned vehicle control system of claim 1, wherein the Vehicle-Dependent Subsystem is a simulator architecture, wherein the simulator computes the incremental moving distance $\Delta s=\upsilon_c \Delta t$ and the vehicle incremental heading orientation $\Delta\theta=\kappa_c \upsilon_c \Delta t$.

6. An unmanned vehicle control system using a timer-interrupt-driven operation with an interval of $\Delta t$, a vehicle's position p and a heading orientation $\theta$ are defined in a world coordinate frame, a pair $(p, \theta)$ of a position and an orientation is denoted as a vehicle transformation, the difference between a present vehicle transformation and its next transformation is denoted as an incremental transformation, an arc length $\Delta s$ of the trajectory of the vehicle position p generated by a vehicle motion during an interval $\Delta t$ is denoted as a vehicle incremental movement distance, and the orientation change $\Delta\theta$ of the vehicle heading orientation $\theta$ generated by a vehicle motion during an interval $\Delta t$ is denoted as a vehicle incremental heading orientation change, comprising:

a computer control system for storing predetermined path data consisting of straight lines and circles, for calculating continuous-curvature motion, for making in-motion corrections using positional feedback, and for switching between the lines and circles;

wherein the computer control system comprises:
a Vehicle-Independent Subsystem; and
a Vehicle-Dependent Subsystem connected to the Vehicle-Independent Subsystem;

wherein the Vehicle-Independent Subsystem further comprises;
a Vehicle-Configuration Estimation Subsystem;
a Continuous-Curvature Motion Calculation Subsystem connected to the Vehicle-Configuration Estimation Subsystem;
a Segment-Switching Test Subsystem connected between the Vehicle-Configuration Estimation Subsystem and the Continuous-Curvature Motion Calculation Subsystem;
a Path Buffer Subsystem connected to the Segment-Switching Test Subsystem and the Continuous-Curvature Motion Calculation Subsystem;

wherein the Vehicle-Configuration Estimation Subsystem receives input of the vehicle incremental movement distance $\Delta s$ and vehicle incremental heading orientation change $\Delta\theta$ from the Vehicle-Dependent Subsystem, computes the present vehicle transformation $q=(p,\theta)$ (position and orientation), trajectory curvature $\kappa$, and vehicle speed $\upsilon$, and then outputs these three items to the Continuous-Curvature Motion Calculation Subsystem and also outputs the present vehicle transformation $q=(p,\theta)$ (position and orientation), and trajectory curvature $\kappa$ to the Segment-Switching Test Subsystem, wherein the incremental transformation, $\Delta q=(\Delta x, \Delta y, \Delta\theta)$, from the previous positioning to the final positioning, is evaluated from $\Delta s$ and $\Delta\theta$ as $$\Delta q = \left( \left( \frac{\sin\Delta\theta}{\Delta\theta} \right) \Delta s, \left( \frac{1 - \cos\Delta\theta}{\Delta\theta} \right) \Delta s, \Delta\theta \right)$$

if $\Delta\theta \neq 0$, and $\Delta q=(\Delta s, 0, 0)$ if $\Delta\theta=0$;

wherein, if the vehicle's previous transformation is q and the incremental transformation is $\Delta q$, the new vehicle transformation is the composition $q \cdot \Delta q$, is calculated as $q \leftarrow q \cdot \Delta q = (x, y, \theta) \cdot (\Delta x, \Delta y, \Delta \theta) = (x + \Delta x \cos \theta - \Delta y \sin \theta, y + \Delta x \sin \theta + \Delta y \cos \theta, \theta + \Delta \theta);$ wherein the present vehicle path curvature κ is calculated by $$\kappa = \frac{\Delta \theta}{\Delta s};$$

wherein the present vehicle speed υ is calculated by $$v = \frac{\Delta s}{\Delta t};$$

wherein the Segment-Switching Test Subsystem receives the input of the present vehicle transformation q=(p,θ) and trajectory curvature κ from the Vehicle-Configuration Estimation Subsystem and receives the second path segment $L_2$ (if any) from the Path Buffer Subsystem, computes a steering function J to track a path segment $L_i$, tests whether the signs of $J(L_1)$ and $J(L_2)$ are distinct, or $J(L_2)=0$, and, if the test is true, sends a switching-needed command to the Path Buffer Subsystem;

wherein the Path Buffer Subsystem stores a path in a form of a list $(L_1, L_2, \dots)$ of path segments, where each path segment $L_i$ is a directed straight line segment or a directed circle segment, sends the present path segment $L_1$ to the Continuous-Curvature Motion Calculation Subsystem, sends the next path segment $L_2$ (if any), to the Segment-Switching Test Subsystem, and shifts the contents of the list when a switching-needed command is accepted from the Segment-Switching Test Subsystem by discarding $L_1$ moving the old $L_2$ into the new $L_1$, moving the old $L_3$ into new $L_2$, and so forth;

wherein the Continuous-Curvature Motion Calculation Subsystem receives the input of the present vehicle transformation q=(p,θ), trajectory curvature κ, and vehicle speed υ from the Vehicle-Configuration Estimation Subsytem, and receives the present path segment $L_1$ input from the Path Buffer Subsystem, computes a steering function J to track a present segment $L_1$ by $$\frac{d\kappa}{ds} = J(L_1) = -a(\kappa - \kappa_1) - b(\theta - \theta_1) - c\Delta d_1,$$

where κ is the curvature, θ the heading of the vehicle respectively, $\kappa_1$ the curvature of segment $L_1$, the tangential orientation of segment $L_1$ at its closest point from the vehicle, the $\Delta d_1$ closest distance from the vehicle to segment $L_1$, where a, b, and c are positive constants determined by another positive paramenter k and said curvature $\kappa_1$ as follows:

$a=3k$ $b=3k^2-\kappa_1^2$ $c=k^3-3k\kappa_1^2;$ and wherein the Vehicle Dependent Subsystem receives the commanded path curvature $\kappa_c$ and commanded speed $\upsilon_c$ from the Continuous-Curvature Motion Caculation Subsystem, executes low-level control tasks for motors, detects the vehicle incremental movement distance Δs and vehicle incremental heading orientation change Δθ, and sends them to the Vehicle-Configuration Estimation Subsystem.

7. A method of controlling an unmanned vehicle control system having a computer control system for storing predetermined path data consisting of straight lines and circles, for calculating continuous-curvature motion, for making in-motion corrections using positional feedback, and for switching between the lines and circles, wherein the computer system has a Vehicle-Independent Subsystem and a Vehicle-Dependent Subsystem, and the Vehicle-Independent Subsystem has a Vehicle-Configuration Estimation Subsystem, a Segment-Switching Test Subsystem, a Path Buffer Subsystem, and a Continuous-Curvature Motion Calculation Subsystem where the method adopts a timer-interrupt-driven operation with an interval of Δt, a vehicle's position p and a heading orientation θ are defined in a world coordinate frame, an arc length Δs of a trajectory of the vehicle position p generated by a vehicle motion during an interval Δt is denoted as a vehicle incremental movement distance, and an orientation change Δθ of the vehicle heading orientation θ generated by a vehicle motion during an interval Δt is denoted as a vehicle incremental heading orientation change, the method comprising:

storing a path in the form of a list $(L_1, L_2, \dots)$ of path segments in the Path Buffer Subsystem, where each path segment $L_i$ is a directed straight line segment or a directed circle segment, receiving the vehicle incremental movement distance Δs and vehicle incremental heading orientation change Δθ, into the Vehicle-Configuration Estimation Subsystem;

computing an incremental transformation Δq=(Δx, Δy, Δθ), from the previous positioning to the final positioning, evaluated from Δs and Δθ as $$\Delta q = \left( \left( \frac{\sin \Delta \theta}{\Delta \theta} \right) \Delta s, \left( \frac{1 - \cos \Delta \theta}{\Delta \theta} \right) \Delta s, \Delta \theta \right)$$

if Δθ≠0, and $\Delta q = (\Delta s, 0, 0)$ if Δθ=0, wherein an ordinary situation, Δs and Δθ are very small, and hence Δq is also tiny, and if the vehicle's previous transformation is q and the incremental transformation is Δq, the new vehicle transformation is the composition q·Δq;

calculating this composition q·Δq as $q \leftarrow q \cdot \Delta q = (x, y, \theta) \cdot (\Delta x, \Delta y, \Delta \theta) = (x + \Delta x \cos \theta - \Delta y \sin \theta, y + \Delta x \sin \theta + \Delta y \cos \theta, \theta + \Delta \theta);$ calculating the present vehicle path curvature κ by $$\kappa = \frac{\Delta \theta}{\Delta s};$$

calculating the present vehicle speed υ by $$v = \frac{\Delta s}{\Delta t};$$

sending the present vehicle speed υ, path curvature κ, and transformation data q, to the Continuous-Curvature Motion Calculation Subsystem at the same time as the path curvature κ and transformation data q are sent to the Segment-Switching Test Subsystem;

sending the next path segment $L_2$ (if any), from the Path Buffer Subsystem to the Segment-Switching Test Subsystem;

receiving into the Segment-Switching Test Subsystem the input of the present vehicle transformation q=(p,θ) and trajectory curvature κ from the Vehicle-Configuration Estimation Subsystem and the second path segment $L_2$ (if any) from the Path Buffer Subsystem;

calculating the steering function $J(L_2)$, if $L_2$ exits, $$\frac{d\kappa}{ds} = J(L_2) = -a\Delta\kappa - b\Delta\theta - c\Delta d_2$$
$$= -a(\kappa - \kappa_2) - b(\theta - \theta_2) - c\Delta d_2$$

wherein a, b, and c are defined through a single positive constant k as follows:

$a=3k$ $b=3k^2-\kappa_1^2$ $c=k^3-3k\kappa_1^2$, the reciprocal of k is denoted by σ and is called smoothness:

$$\sigma = \frac{1}{k};$$

testing in the Segment-Switching Test Subsystem to see if $J(L_2)=0$ or $J(L_2)$ crosses the zero value;

sending a switching-needed command to the Path Buffer Subsystem if the previous test is positive;

shifting the contents of the list when a switching-needed command is accepted from the Segment-Switching Test Subsystem, by discarding $L_1$, moving the old $L_2$ into new $L_1$, moving the old $L_3$ into new $L_2$, and so forth;

sending the present path segment $L_1$ from the Path Buffer Subsystem to the Continuous-Curvature Motion Calculation Subsystem;

receiving into the Continuous-Curvature Motion Calculation Subsystem (i) the present path segment $L_1$ from the Path Buffer Subsystem and (ii) the input of the present vehicle transformation q=(p,θ), trajectory curvature κ, and vehicle speed υ from the Vehicle-Configuration Estimation Subsystem;

computing the steering function $J(L_1)$ to track a segment $L_1$, is $$\frac{d\kappa}{ds} = J(L_1) = -a\Delta\kappa - b\Delta\theta - c\Delta d_1$$
$$= -a(\kappa - \kappa_1) - b(\theta - \theta_1) - c\Delta d_1$$

wherein a, b, and c are defined through a single positive constant k as follows:

$a=3k$ $b=3k^2-\kappa_1^2$ $c=k^3-3k\kappa_1^2$, the reciprocal of k is denoted by σ and is called smoothness:

$$\sigma = \frac{1}{k};$$

calculating the commanded vehicle speed $\upsilon_c$ and the commanded vehicle path curvature $\kappa_c$ as $\kappa_c = \kappa + J(L_1) \cdot \Delta s$;

sending the commanded vehicle speed $\upsilon_c$ and the commanded vehicle path curvature $\kappa_c$ from the Continuous-Curvature Motion Calculation Subsystem to the Vehicle-Dependent Subsystem for executing the commands; and receiving into the Vehicle-Dependent Subsystem and responding to the commanded path curvature $\kappa_c$ and commanded speed $\upsilon_c$, performing low-level control tasks for motors, and responding to these data and computing the vehicle incremental movement distance Δs and vehicle incremental heading orientation change Δθ, and sending Δs and Δθ as feedback to the Vehicle-Configuration Estimation Subsystem.

* * * * *